US012307788B2

(12) United States Patent
Park et al.

(10) Patent No.: US 12,307,788 B2
(45) Date of Patent: May 20, 2025

(54) SENSOR FUSION FOR AUTONOMOUS MACHINE APPLICATIONS USING MACHINE LEARNING

(71) Applicant: NVIDIA Corporation, Santa Clara, CA (US)

(72) Inventors: Minwoo Park, Saratoga, CA (US); Junghyun Kwon, Santa Clara, CA (US); Mehmet K. Kocamaz, San Jose, CA (US); Hae-Jong Seo, Campbell, CA (US); Berta Rodriguez Hervas, San Francisco, CA (US); Tae Eun Choe, Belmont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 25 days.

(21) Appl. No.: 18/309,878

(22) Filed: May 1, 2023

(65) Prior Publication Data
US 2023/0282005 A1    Sep. 7, 2023

Related U.S. Application Data

(63) Continuation of application No. 17/353,231, filed on Jun. 21, 2021, now Pat. No. 11,688,181.
(Continued)

(51) Int. Cl.
*G06T 7/292* (2017.01)
*B60W 60/00* (2020.01)
(Continued)

(52) U.S. Cl.
CPC ..... *G06V 20/588* (2022.01); *B60W 60/00272* (2020.02); *G06T 7/292* (2017.01);
(Continued)

(58) Field of Classification Search
None
See application file for complete search history.

(56) References Cited

U.S. PATENT DOCUMENTS 10,282,852 B1    5/2019 Buibas et al.
10,871,783 B2   12/2020 Julian et al.
(Continued)

FOREIGN PATENT DOCUMENTS

CN   109466548 A   3/2019
CN   111133447 A   5/2020
(Continued)

OTHER PUBLICATIONS

IEC 61508, "Functional Safety of Electrical/Electronic/Programmable Electronic Safety-related Systems," https://en.wikipedia.org/wiki/IEC_61508, accessed on Apr. 1, 2022, 7 pgs.
(Continued)

*Primary Examiner* — Idowu O Osifade
(74) *Attorney, Agent, or Firm* — Taylor English Duma L.L.P.

(57) ABSTRACT

In various examples, a multi-sensor fusion machine learning model—such as a deep neural network (DNN)—may be deployed to fuse data from a plurality of individual machine learning models. As such, the multi-sensor fusion network may use outputs from a plurality of machine learning models as input to generate a fused output that represents data from fields of view or sensory fields of each of the sensors supplying the machine learning models, while accounting for learned associations between boundary or overlap regions of the various fields of view of the source sensors. In this way, the fused output may be less likely to include duplicate, inaccurate, or noisy data with respect to objects or features in the environment, as the fusion network may be
(Continued)

trained to account for multiple instances of a same object appearing in different input representations.

20 Claims, 20 Drawing Sheets

Related U.S. Application Data

(60) Provisional application No. 63/043,794, filed on Jun. 25, 2020, provisional application No. 63/047,205, filed on Jul. 1, 2020.

(51) Int. Cl.
*G06V 20/56* (2022.01)
*G06V 20/58* (2022.01)

(52) U.S. Cl.
CPC ..... *G06V 20/58* (2022.01); *B60W 2554/4029* (2020.02); *B60W 2554/4044* (2020.02); *B60W 2556/35* (2020.02); *G06T 2207/20081* (2013.01); *G06T 2207/20084* (2013.01)

(56) References Cited

U.S. PATENT DOCUMENTS

| | | | |
|---|---|---|---|
| 10,885,698 B2 | 1/2021 | Muthler et al. | |
| 11,393,097 B2 | 7/2022 | Brunner et al. | |
| 11,548,533 B2 | 1/2023 | Liang et al. | |
| 11,688,181 B2 | 6/2023 | Park et al. | |
| 2018/0329066 A1 | 11/2018 | Pacala | |
| 2019/0025853 A1 | 1/2019 | Julian et al. | |
| 2019/0049958 A1* | 2/2019 | Liu | G01S 17/00 |
| 2019/0258251 A1 | 8/2019 | Ditty et al. | |
| 2019/0325580 A1* | 10/2019 | Lukac | G06T 3/4038 |
| 2019/0346842 A1 | 11/2019 | Bye et al. | |
| 2019/0384291 A1 | 12/2019 | Michalakis et al. | |
| 2020/0184718 A1* | 6/2020 | Chiu | G06T 7/20 |
| 2020/0219264 A1 | 7/2020 | Brunner et al. | |
| 2020/0265247 A1* | 8/2020 | Musk | G06N 20/00 |
| 2020/0410259 A1* | 12/2020 | Srinivasan | G06F 17/18 |
| 2021/0241026 A1* | 8/2021 | Deng | G01S 7/497 |
| 2021/0264224 A1* | 8/2021 | Tamaoki | G01S 13/931 |
| 2021/0334556 A1* | 10/2021 | Vignard | G06V 20/58 |
| 2022/0012518 A1 | 1/2022 | Sutherland | |
| 2022/0019735 A1 | 1/2022 | Shekhar et al. | |

FOREIGN PATENT DOCUMENTS

| | | |
|---|---|---|
| WO | 2017165627 A1 | 9/2017 |
| WO | 2019233576 A1 | 12/2019 |

OTHER PUBLICATIONS

ISO 26262, "Road vehicle—Functional safety," International standard for functional safety of electronic system, https://en.wikipedia.org/wiki/ISO_26262, accessed on Sep. 13, 2021, 8 pgs.
"Taxonomy and Definitions for Terms Related to Driving Automation Systems for On-Road Motor Vehicles", Society of Automotive Engineers (SAE), Standard No. J3016-201609, pp. 30 (Sep. 30, 2016).
"Taxonomy and Definitions for Terms Related to Driving Automation Systems for On-Road Motor Vehicles", Society of Automotive Engineers (SAE), Standard No. J3016-201806, pp. 35 (Jun. 15, 2018).
Park, et al.; Preliminary Report on Patentability for International Application No. PCT/US2021/038262, filed Jun. 21, 2021, mailed Jan. 5, 2023, 9 pgs.
Park, et al.; Notice of Allowance for U.S. Appl. No. 17/353,231, filed Jun. 21, 2021, mailed Mar. 6, 2023, 26 pgs.
Oh, et al.; "Object Detection and Classification by Decision-Level Fusion for Intelligent Vehicle Systems," Sensors (Basel), vol. 17, pp. 1-21 (Jan. 22, 2017).
Caltagirone, et al.; "LIDAR-Camera Fusion for Road Detection Using Fully Convolutional Neural Networks," arxiv.org, Cornell University Library, pp. 1-7 (Sep. 21, 2018).
Park, et al.; International Search Report and Written Opinion for International Application No. PCT/US2021/038262, filed Jun. 21, 2021, mailed Sep. 13, 2021, 14 pgs.
"Programmable Vision Accelerator", U.S. Appl. No. 15/141,703, filed Apr. 28, 2016.
"Reliability Enhancement Systems and Methods" U.S. Appl. No. 15/338,247, filed Oct. 28, 2016.
"Methodology of Using a Single Controller (ECU) For a Fault-Tolerant/Fail-Operational Self-Driving System", U.S. Appl. No. 62/524,283, filed Jun. 23, 2017.
"Systems and Methods for Safe and Reliable Autonomous Vehicles" U.S. Appl. No. 62/584,549, filed Nov. 10, 2017.
"System and Method for Controlling Autonomous Vehicles", U.S. Appl. No. 62/614,466, filed Jan. 7, 2018.
"System and Method for Safe Operation of Autonomous Vehicles", U.S. Appl. No. 62/625,351, filed Feb. 2, 2018.
"Conservative Control for Zone Driving of Autonomous Vehicles Using Safe Time of Arrival", U.S. Appl. No. 62/628,831, filed Feb. 9, 2018.
"System and Method for Sharing Camera Data Between Primary and Backup Controllers in Autonomous Vehicle Systems", U.S. Appl. No. 62/629,822, filed Feb. 13, 2018.
"Pruning Convolutional Neural Networks for Autonomous Vehicles and Robotics", U.S. Appl. No. 62/630,445, filed Feb. 14, 2018.
"Methods for accurate real-time object detection and for determining confidence of object detection suitable for autonomous vehicles" U.S. Appl. No. 62/631,781, filed Feb. 18, 2018.
"System and Method for Autonomous Shuttles, Robo-Taxis, Ride-Sharing and On-Demand Vehicles", U.S. Appl. No. 62/635,503, filed Feb. 26, 2018.
"Convolutional Neural Networks to Detect Drivable Freespace for Autonomous Vehicles" U.S. Appl. No. 62/643,665, filed Mar. 15, 2018.
"Deep Neural Network for Estimating Depth from Stereo Using Semi-Supervised Learning", U.S. Appl. No. 62/646,148, filed Mar. 21, 2018.
"System and Methods for Advanced AI-Assisted Vehicles", U.S. Appl. No. 62/648,358, filed Mar. 26, 2018.
"System and Method for Training, Testing, Verifying, and Validating Autonomous and Semi-Autonomous Vehicles", U.S. Appl. No. 62/648,399, filed Mar. 27, 2018.
"Method and System of Remote Operation of a Vehicle Using an Immersive Virtual Reality Environment", U.S. Appl. No. 62/648,493, filed Mar. 27, 2018.
"System and Methods for Virtualized Intrusion Detection and Prevent System in Autonomous Vehicles", U.S. Appl. No. 62/682,803, filed Jun. 8, 2018.
"Deep Learning for Path Detection in Autonomous Vehicles", U.S. Appl. No. 62/684,328, filed Jun. 13, 2018.
"Methods for High-Precision, High-Accuracy Lane Detection in Autonomous Driving Applications", U.S. Appl. No. 62/699,669, filed Jul. 17, 2018.
Wekel, Tilman; Non-Final Office Action for U.S. Appl. No. 17/187,350, filed Feb. 26, 2021, mailed Sep. 17, 2024, 45 pgs.
Park, Minwoo; First Office Action for Chinese Patent Application No. 202180005884.8, filed Apr. 14, 2022, mailed Feb. 10, 2025, 7 pgs.
Wekel, Tilman; Final Office Action for U.S. Appl. No. 17/187,350, filed Feb. 26, 2021, mailed Feb. 28, 2025, 44 pgs.

* cited by examiner

SENSOR FUSION FOR AUTONOMOUS MACHINE APPLICATIONS USING MACHINE LEARNING

CROSS-REFERENCE TO RELATED APPLICATIONS

This application is a continuation of U.S. patent application Ser. No. 17/353,231, filed Jun. 21, 2021, which claims the benefit of U.S. Provisional Application No. 63/047,205, filed Jul. 1, 2020, and U.S. Provisional Application No. 63/043,794, filed on Jun. 25, 2020. Each of which is hereby incorporated by reference in its entirety.

This application is related to U.S. Non-Provisional application Ser. No. 17/187,350, filed on Feb. 26, 2021, which is hereby incorporated by reference in its entirety

BACKGROUND

The ability to safely detect static and dynamic objects, obstacles, hazards, wait conditions, road markings, signs, and/or other features of an environment are important tasks for any autonomous or semi-autonomous driving system. For example, detecting locations of various static and/or dynamic features or objects in the environment in three-dimensional (3D) space is especially challenging, and may result in noisy or less accurate data-especially with respect to borders or overlap regions between fields of view of different sensors.

In some systems, deep neural networks (DNNs) may be deployed to generate 3D information corresponding to a field of view of an associated sensor that provides sensor data to the DNN. For objects or landmarks appearing near image borders, for example, these perception systems may result in noisy results as the object or landmark disappears and reappears in the field of view of the sensor—e.g., resulting in quick changes between detecting and not detecting a same object or landmark. As a result, when tracking objects or landmarks across frames, for example, the results may be inaccurate or imprecise and may result in reduced performance of the system.

To account for these potential drawbacks of individual DNNs, some conventional systems employ hand crafted or rule-based algorithms to stitch together outputs from a plurality of DNNs. However, where fields of view overlap between neighboring sensors that provide sensor data to respective DNNs, the fused predictions along borders or overlap regions may be inconsistent or inaccurate. For example, a DNN running on a sensor with a 120 degree field of view may predict that an object ten meters from the sensor is nine meters away, and another DNN running on a sensor with a 60 degree field of view may predict that the object is eleven meters away. In such an example, although the individual DNNs are only off by a meter from the actual distance of the object, the outputs are two meters off from one another, which may be a large enough distance gap to cause the fused output to include two separate duplicate objects as opposed to the single object that is actually represented in the data. This false determination that two separate objects are present may then be relied upon by the underlying system, and the false detection may propagate through object tracking, planning, control, obstacle avoidance, and/or other operations of the machine.

SUMMARY

Embodiments of the present disclosure relate to machine learning based sensor fusion for autonomous machine applications. Systems and methods are disclosed that use a multi-sensor fusion machine learning model—such as a deep neural network (DNN)—to fuse data from a plurality of individual machine learning models. For example, a plurality of machine learning models may be trained to generate outputs that may be used directly, or after post-processing, as inputs to a multi-sensor fusion network. Each output that is received as input by the multi-sensor fusion network may correspond to a same type of representation—such as a rasterized image from a same perspective (e.g., a top-down, ego-centric perspective). As such, the multi-sensor fusion network may use these inputs to generate a fused output that represents data from fields of view or sensory fields of each of the sensor types, while accounting for learned associations between boundary or overlap regions of the various fields of view of the source sensors. In this way, the fused output may be less likely to include duplicate, inaccurate, or noisy data with respect to objects or features in the environment, as the fusion network may be trained to account for multiple instances of a same object appearing in different input representations.

In some embodiments, in addition to or alternatively from using the outputs from the various source machine learning models, internal values of the respective machine learning models—e.g., output values from one or more feature extractor layers internal to the various DNNs—may be provided as input to the multi-sensor fusion network. In such an example, the multi-sensor fusion network and the select layers of the individual machine learning models may be trained together in an end-to-end training process. As such, updates to weights and biases as a result of one or more loss functions may be back propagated through not only the layers of the multi-sensor fusion network, but also through to the layers of the respective source machine learning models (e.g., the feature extractor layers).

To further increase the accuracy and precision of the multi-sensor fusion network, one or more additional channels may be provided as input to the multi-sensor fusion network—e.g., at each iteration. For example, a location prior channel may be used to represent the distance estimation uncertainty—e.g., as a probability distribution function (PDF)—at one or more pixels or points corresponding to fields of view or sensor fields of one or more source sensors. In some embodiments, a velocity image channel may be used as input to the multi-sensor fusion network to represent associated velocities for detected objects in the environment. For example, different sensor or machine learning model outputs may include velocity information—e.g., in the x and/or y directions—and the associated velocities for objects may be used to fuse objects together (e.g., where velocity predictions closely match) or to represent two or more objects (e.g., where velocity predictions for closely located objects are greater than a threshold difference). In addition, instance and/or appearance based spatial and/or temporal association channels may be used as additional inputs to the multi-sensor fusion network to help identify similarly object appearances across different inputs and/or similar object appearances across time steps—e.g., by using a recurrent neural network to track objects across time.

As a result, the underlying machine learning models that provide data to the multi-sensor fusion network may be optimized to generate outputs that are useful in improving the accuracy of the fused outputs of the multi-sensor fusion network. Additional inputs—e.g., a location prior channel, velocity image channel, etc.—may be used to further improve the accuracy and precision of the multi-sensor fusion network, especially with respect to boundary or overlap regions between adjacent sensor fields of view or sensory fields. By reducing noise and increasing the accuracy and precision of the multi-sensor fusion network, the downstream processes that rely on these outputs of the multi-sensor fusion network-representing locations, velocities, poses, appearances, etc. of static and dynamic objects or features in the environment—may also benefit from increased performance and effectiveness.

BRIEF DESCRIPTION OF THE DRAWINGS

The present systems and methods for machine learning based sensor fusion for autonomous machine applications are described in detail below with reference to the attached drawing figures, wherein.

DETAILED DESCRIPTION

Systems and methods are disclosed related to machine learning based sensor fusion for autonomous machine applications. Although the present disclosure may be described with respect to an example autonomous vehicle 800 (alternatively referred to herein as "vehicle 800," "autonomous machine 800," or "ego-vehicle 800," an example of which is described with respect to FIGS. 8A-8D), this is not intended to be limiting. For example, the systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle or machine types. In addition, although the present disclosure may be described with respect to sensor fusion for autonomous or semi-autonomous machine operations, this is not intended to be limiting, and the systems and methods described herein may be used in augmented reality, virtual reality, mixed reality, robotics, security and surveillance, autonomous or semi-autonomous machine applications, and/or any other technology spaces where sensor fusion may be used.

Figure 1A:
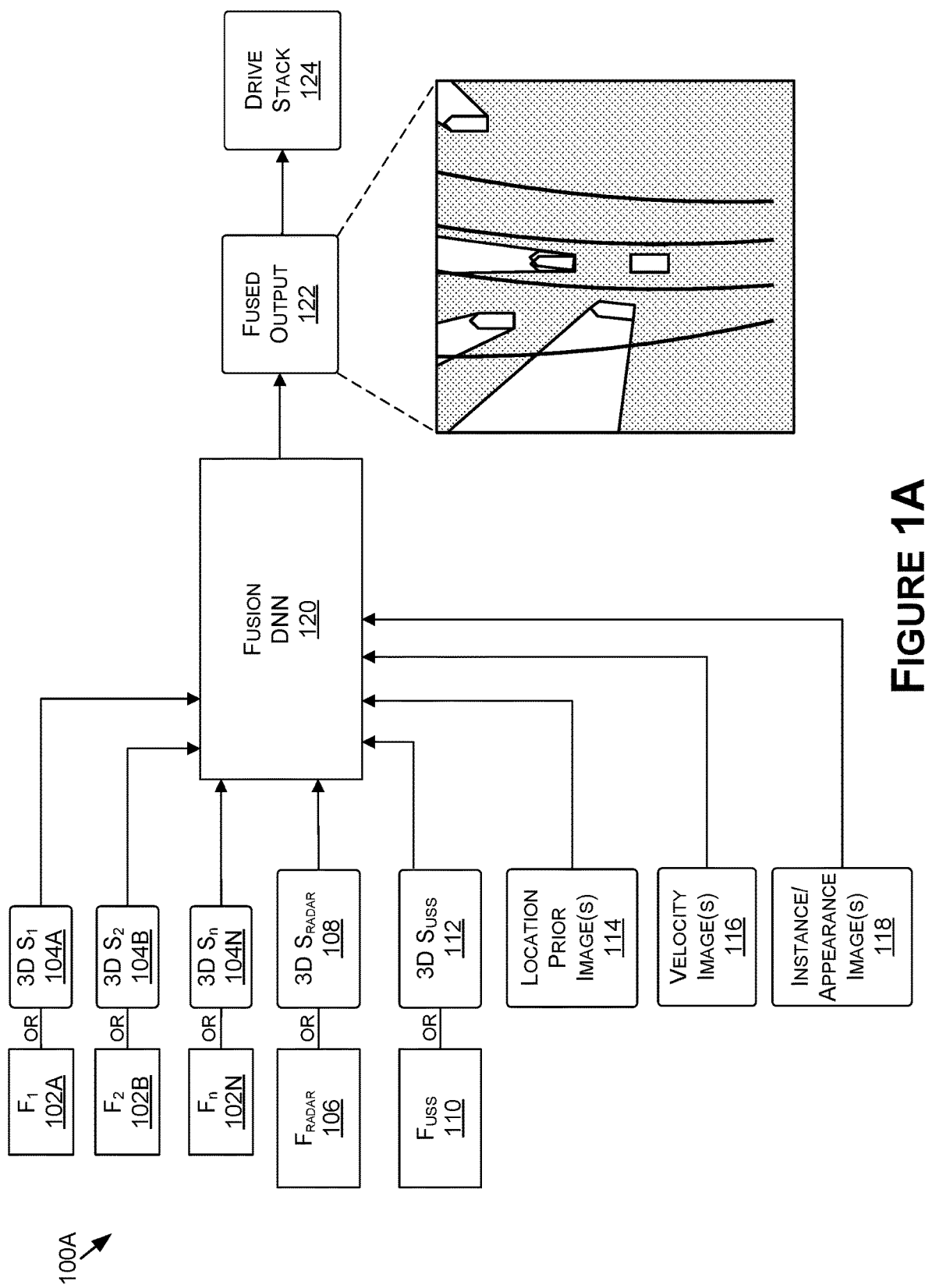
FIGS. 1A and 1B are example data flow diagrams corresponding to processes and for multi-sensor fusion, in accordance with some embodiments of the present disclosure, in accordance with some embodiments of the present disclosure.
Figure 1B:
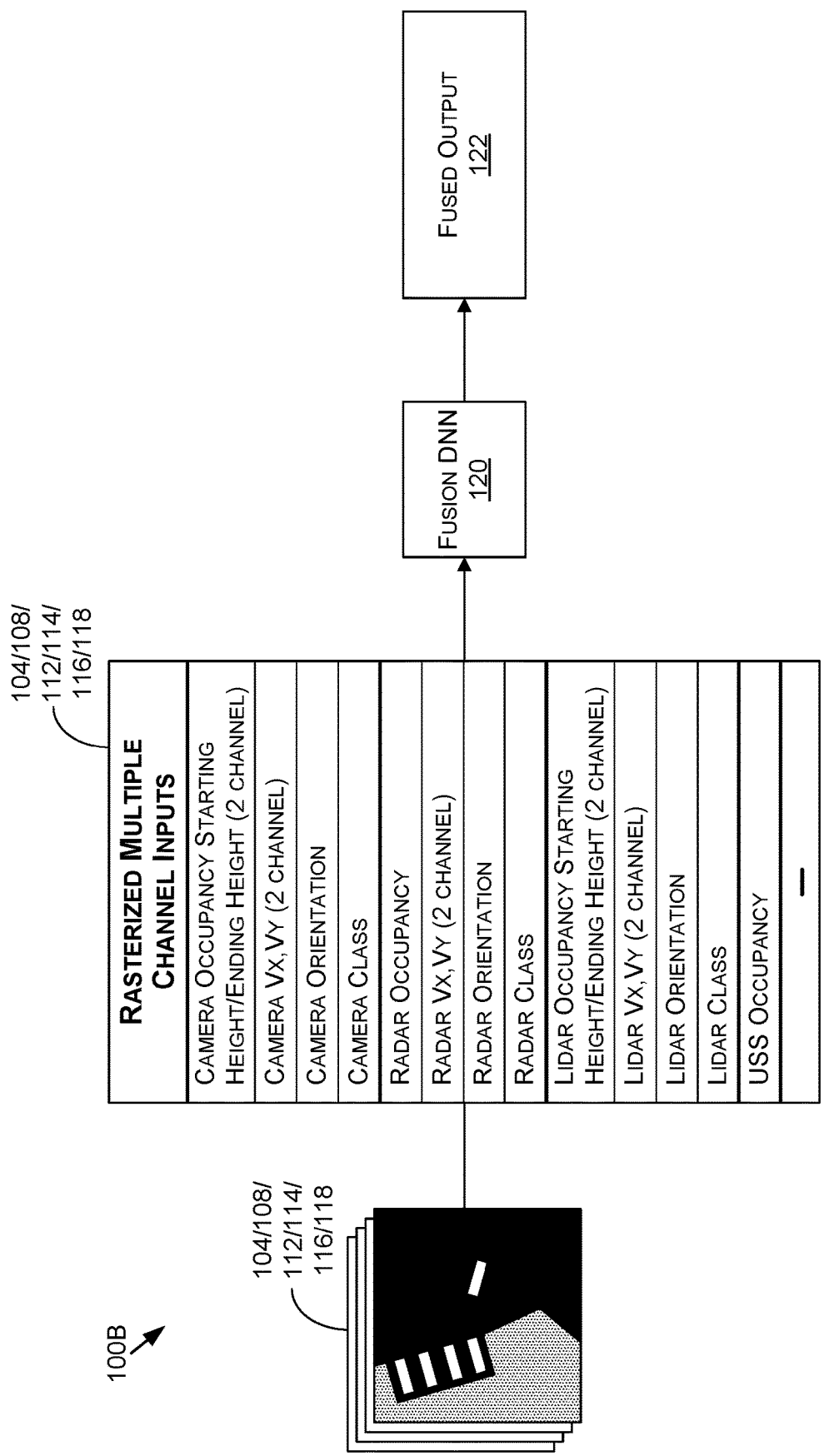

With reference to FIGS. 1A-1B, FIGS. 1A-1B are example data flow diagrams corresponding to processes 100A and 100B (referred collectively herein as "a process 100") for multi-sensor fusion, in accordance with some embodiments of the present disclosure. It should be understood that these and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the processes 100A and 100B may be executed using components, features, and/or functionality of the machine 800 of FIGS. 8A-8D, example computing device 900 of FIG. 9, and/or example data center 1000 of FIG. 10.

The process 100 may include generating, accessing, and/or receiving sensor data from one or more sensors. The sensor data may be received, as a non-limiting example, from one or more sensors of a vehicle (e.g., vehicle 800 of FIGS. 8A-8D as described herein). The sensor data may be used by the vehicle 800, and within the process 100, to compute two-dimensional (2D) and/or three-dimensional (3D) signals ($S_1$-$S_n$) 104A-104N using respective DNNs corresponding to camera sensors, 3D RADAR signals ($S_{RADAR}$) 108 for RADAR sensors (which may be computed using the RADAR data alone and/or may be computed using a DNN), 3D ultrasonic signals ($S_{USS}$) 112 for ultrasonic sensors (which may be computed using the ultrasonic data alone and/or may be computed using a DNN), 3D LiDAR signals ($S_{LiDAR}$) (not shown) for LiDAR sensors (which may be computed using the LiDAR data alone and/or may be computed using a DNN), and/or to compute other output signals using additional or alternative sensor data (from any sensor modality) and/or corresponding DNNs. In some embodiments, the sensor data may be used to compute outputs internal to the DNNs themselves, such as feature outputs ($F_1$-$F_n$) 102A-102N for DNNs that use cameras signals, RADAR feature outputs ($F_{RADAR}$) 106 for RADAR sensors, ultrasonic feature outputs ($F_{USS}$) 110 for ultrasonic sensors, LiDAR feature outputs ($F_{LiDAR}$) for LiDAR sensors, and/or other feature outputs for other sensor types. As such, the sensor data may be computed using any number of sensors and using any number of different sensor modalities, and the sensor data may be used directly (e.g., with or without pre-processing, such as converting raw LiDAR data to point clouds) and/or may be used after processing by a DNN or another type of machine learning model.

During training (described in more detail herein with respect to FIGS. 6A-7), the sensor data may be generated using one or more data collection vehicles that generate sensor data for training DNNs, such as the DNN(s) associated with the feature outputs and/or the 3D signals, and/or may be pre-generated and included in a training data set. The sensor data used during training may additionally or alternatively be generated using simulated sensor data (e.g., sensor data generated using one or more virtual sensors of a virtual vehicle in a virtual environment) and/or augmented sensor data (e.g., sensor data generated using one or more data collection vehicles and modified with virtual data, respectively). Once trained and deployed in the vehicle 800, the sensor data may be generated by one or more sensors of the vehicle 800 and processed by the DNN(s) to compute the various output signals and/or to compute the feature outputs from one or more feature extractor layers of respective DNNs.

Figure 8A:
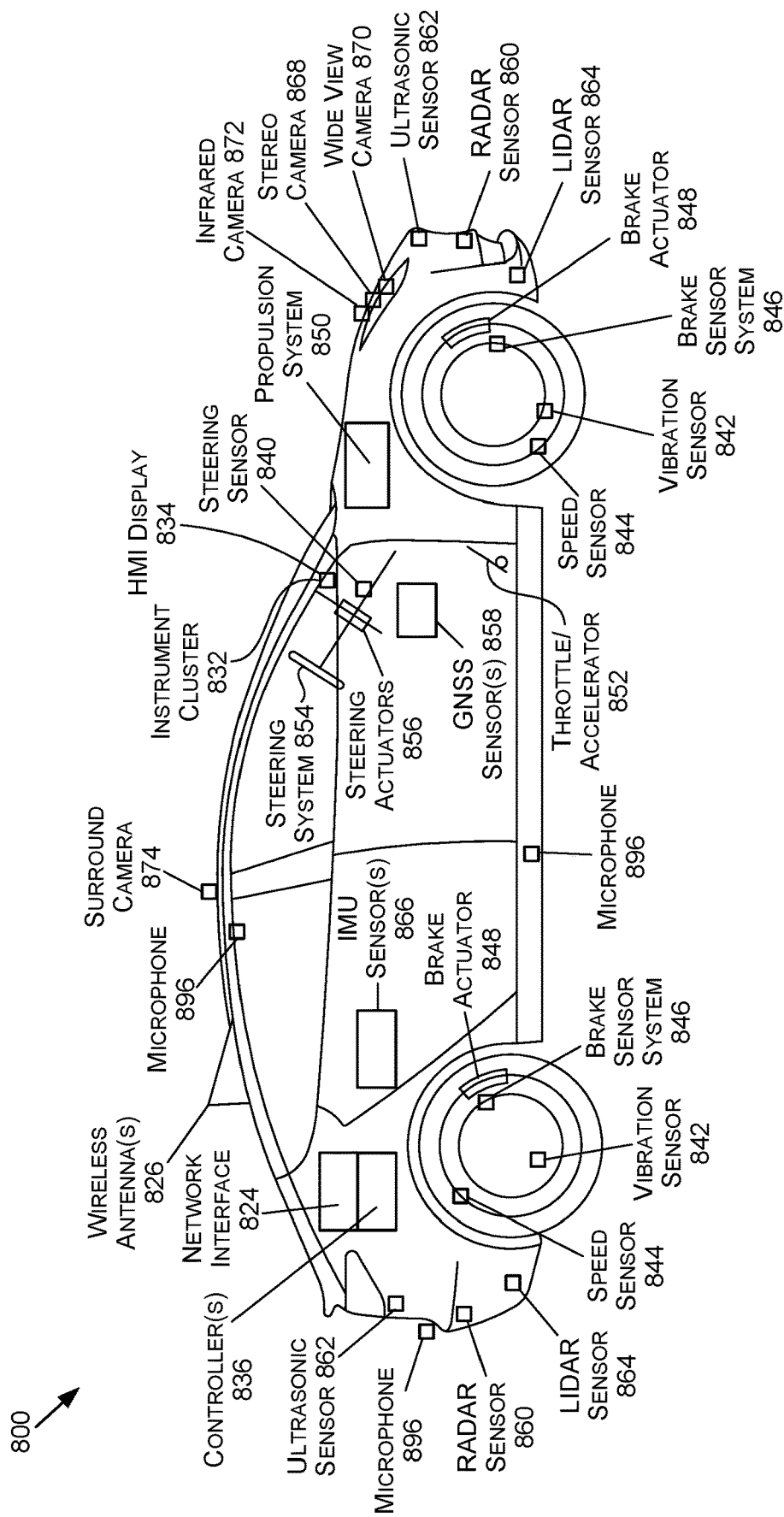
FIG. 8A is an illustration of an example autonomous vehicle, in accordance with some embodiments of the present disclosure.
Figure 8B:
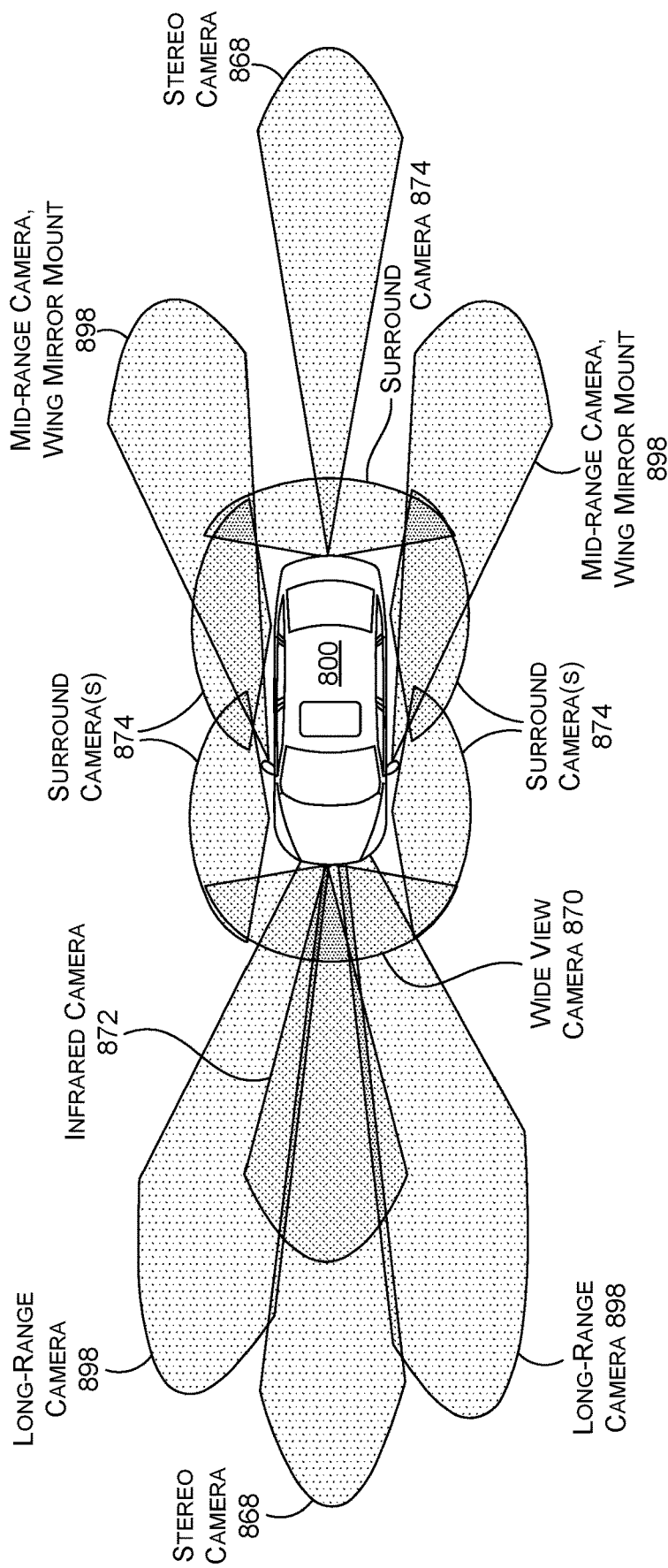
FIG. 8B is an example of camera locations and fields of view for the example autonomous vehicle of FIG. 8A, in accordance with some embodiments of the present disclosure.
Figure 8C:
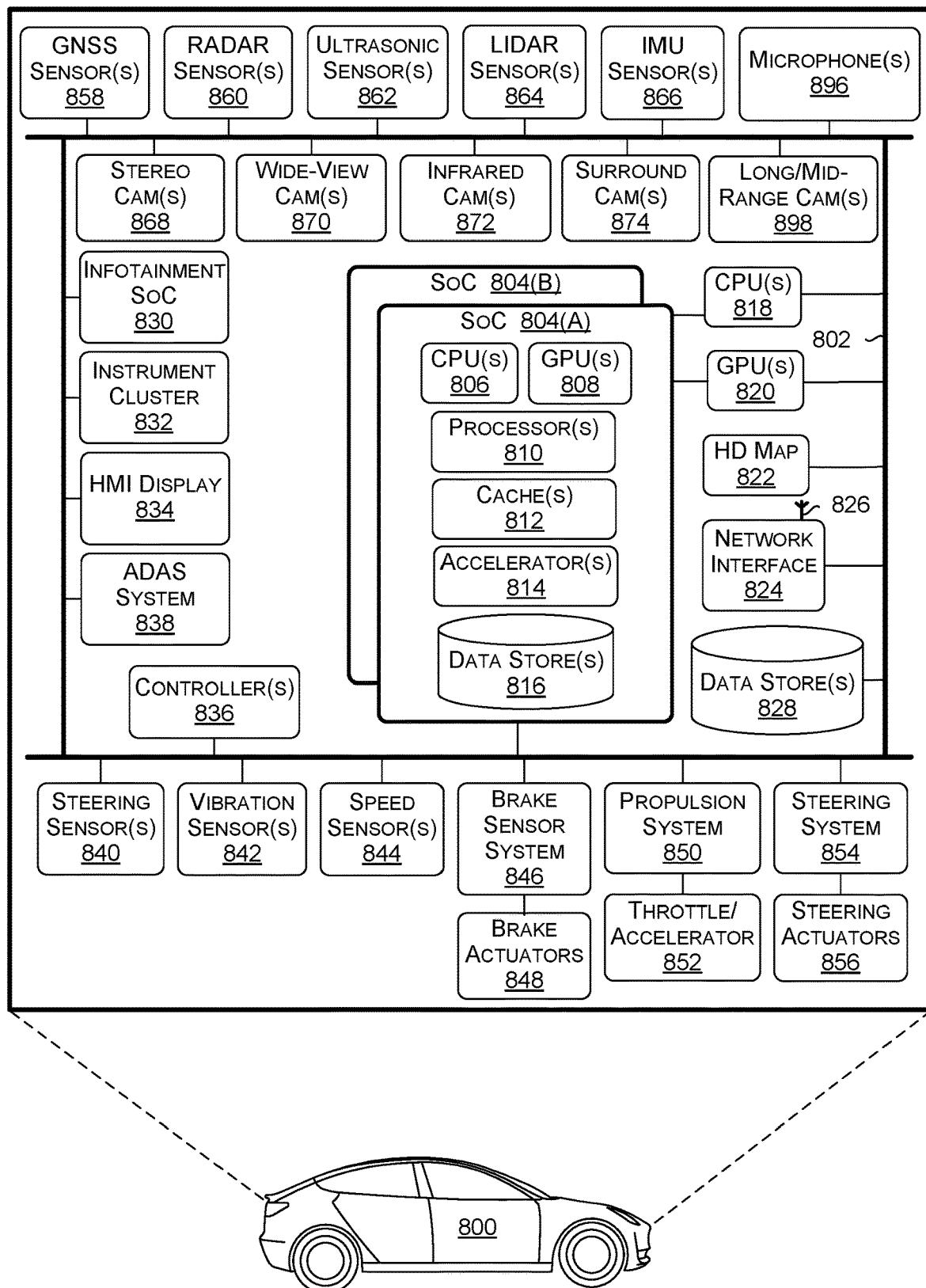
FIG. 8C is a block diagram of an example system architecture for the example autonomous vehicle of FIG. 8A, in accordance with some embodiments of the present disclosure.

For non-limiting examples, the sensor data may include data from any of the sensors of the vehicle 800 including, for example and with reference to FIGS. 8A-8C, RADAR sensor(s) 860, ultrasonic sensor(s) 862, LiDAR sensor(s) 864, stereo camera(s) 868, wide-view camera(s) 870 (e.g., fisheye cameras), infrared camera(s) 872, surround camera(s) 874 (e.g., 360 degree cameras), long-range and/or mid-range camera(s) 878, and/or other sensor types. As another example, the sensor data may include virtual (e.g., simulated or augmented) sensor data generated from any number of sensors of a virtual vehicle or other virtual object in a virtual (e.g., testing) environment. In such an example, the virtual sensors may correspond to a virtual vehicle or other virtual object in a simulated environment (e.g., used for testing, training, and/or validating DNN performance), and the virtual sensor data may represent sensor data captured by the virtual sensors within the simulated or virtual environment. As such, by using the virtual sensor data, the DNN(s) described herein may be tested, trained, and/or validated using simulated or augmented data in a simulated environment, which may allow for testing more extreme scenarios outside of a real-world environment where such tests may be less safe.

In some embodiments, the sensor data may include image data representing an image(s), image data representing a video (e.g., snapshots of video), and/or sensor data representing representations of sensory fields of sensors (e.g., depth maps, point clouds, range images, etc. for LiDAR sensors, a value graph for ultrasonic sensors, etc.). Where the sensor data includes image data, any type of image data format may be used, such as, for example and without limitation, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC), or other type of imaging sensor, and/or other formats. In addition, in some examples, the sensor data may be used within the process 100 without any pre-processing (e.g., in a raw or captured format), while in other examples, the sensor data may undergo pre-processing (e.g., noise balancing, demosaicing, scaling, cropping, augmentation, white balancing, tone curve adjustment, point cloud generation, projection image generation (e.g., to generate a LiDAR range image), etc., such as using a sensor data pre-processor (not shown)). As used herein, the sensor data may reference unprocessed sensor data, pre-processed sensor data, or a combination thereof.

In examples where LiDAR sensors are used to generate, e.g., point clouds, point cloud from one or more LiDAR sensors may be merged together—e.g., after executing motion compensation for an ego-machine 800 and/or executing data synchronization to handle motion-related LiDAR and time synchronization issues. Similarly, combinations of sensor data representations (e.g., point clouds, depth maps, etc.) for different sensor types—e.g., RADAR, ultrasonic, etc.—may also undergo similar pre-processing prior to being used directly and/or processed by one or more machine learning models to compute the 3D signals.

For training, as described in more detail herein, the sensor data may include original images (e.g., as captured by one or more image sensors), down-sampled images, up-sampled images, cropped or region of interest (ROI) images, otherwise augmented images, and/or a combination thereof. Similarly, where the sensor data corresponds to data other than image data, the sensor data used for training may include different orientations, projections, points of reference, augmentation, cropping, filtering, and/or the like. During training of the DNN(s)—including fusion DNN 120—ground truth data may be generated. In some embodiments, the ground truth data may be generated automatically in an unsupervised manner (e.g., using photometric consistency loss between outputs of sensors with at least partially overlapping fields of view or sensory fields), may be generated in a supervised manner using annotation data, for example, and/or may be generated in a semi-supervised manner. Where annotations are used to generate ground truth data, the annotations may be generated within a drawing program (e.g., an annotation program), a computer aided design (CAD) program, a labeling program, another type of program suitable for generating the annotations, and/or may be hand drawn, in some examples. In any example, annotation data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines the location of the labels), and/or a combination thereof (e.g., human identifies center or origin point and dimensions of areas, machine generates polygons and/or labels for intersection areas).

In embodiments, each feature output or 3D signal may correspond to a respective sensor pipeline or stream. For example, a first sensor pipeline may include a first camera that may generate image data that may be processed by a first DNN to generate the feature outputs $F_1$ and/or the 3D signal 104A, a second sensor pipeline may include a second camera that may generate image data that may be processed by a second DNN to generate the feature outputs $F_2$ and/or the 3D signal 104B, a third sensor pipeline may include a first RADAR sensor that may generate RADAR data that may be processed directly—e.g., using a sensor data preprocessor—and/or may be processed using a DNN to generate the feature outputs $F_{RADAR}$ and/or the 3D signal 108, and so on. Depending on the embodiment, any number of sensor pipelines may be used.

Where the process 100 uses the 3D signals, the 3D signals may be computed by each respective DNN in a same format, or may be converted—e.g., using a post-processor—to a same format. For example, in some non-limiting embodiments, the 3D signals that are used as inputs to the fusion DNN 120 may include rasterized images generated from a certain perspective (e.g., top-down birds eye view, projection images, such as range images, side-view images, etc.) that encode any number of input channels. The rasterized images—including the fused output rasterized image computed using the fusion DNN—may be ego-centric, in embodiments, where the ego-machine 800 is at the center of the representation. In other embodiments, the input 3D signals may be generated from a perspective of the ego-machine 800, and the fused output 122 may be generated from an ego-centric point of view. For example, the input channels may indicate a shape, orientation, and/or classification for objects or features in the environment. In such an example, a rasterized image may include bounding shapes or cuboids corresponding to dynamic actors, for example, and may include lines corresponding to lane markers (e.g., lane dividers, road dividers, solid lines, dashed lines, double lines, yellow lines, white lines, etc.), wait conditions (e.g., cross walks, stop lines, etc.), and/or other driving surface features, a boundary or encoded values for pixels corresponding to drivable freespace (e.g., an area of the environment that the ego-machine 800 is able to traverse), and/or other objects or features.

The input channels included in the rasterized input image (or other input representation) may include, without limitation, an object or feature location or occupancy channel that may include a starting height of an object as a channel and/or an ending height of the object as a channel (e.g., where a top-down view rasterized image is generated, the pixel locations may denote an x or y pixel location of the corresponding feature or object indicating a location laterally or longitudinally with respect to an ego-machine 800, and the pixel may be encoded with one or more height channels indicating an elevation of the object or feature), one or more velocity channels (e.g., pixels of the image may be encoded with velocity in the x and/or y directions), an orientation channel corresponding to one or more objects (e.g., encoded as an angle(s)), and/or a classification channel corresponding to one or more objects or features, and/or additional or alternative channels. In addition, these channels may be rasterized for each different input image corresponding to the respective sensor pipeline. For example, for the camera sensor pipeline including the 3D signal 104A, there may be an occupancy channel(s), a velocity channel(s), a classification channel(s), etc., and for the RADAR sensor pipeline including the 3D signal 108 there may be an occupancy channel(s), a velocity channel(s), a classification channel(s), etc., and so on, for each sensor pipeline's input representation. In some embodiments, different input signals to the fusion DNN 120 may include different channel types, the same channel types, or a combination thereof. For a non-limiting example, a first sensor pipeline may generate a 3D signal 104A that includes an occupancy channel(s) and a velocity channel(s), while a 3D signal 112 may only include an occupancy channel(s).

Figure 2A:
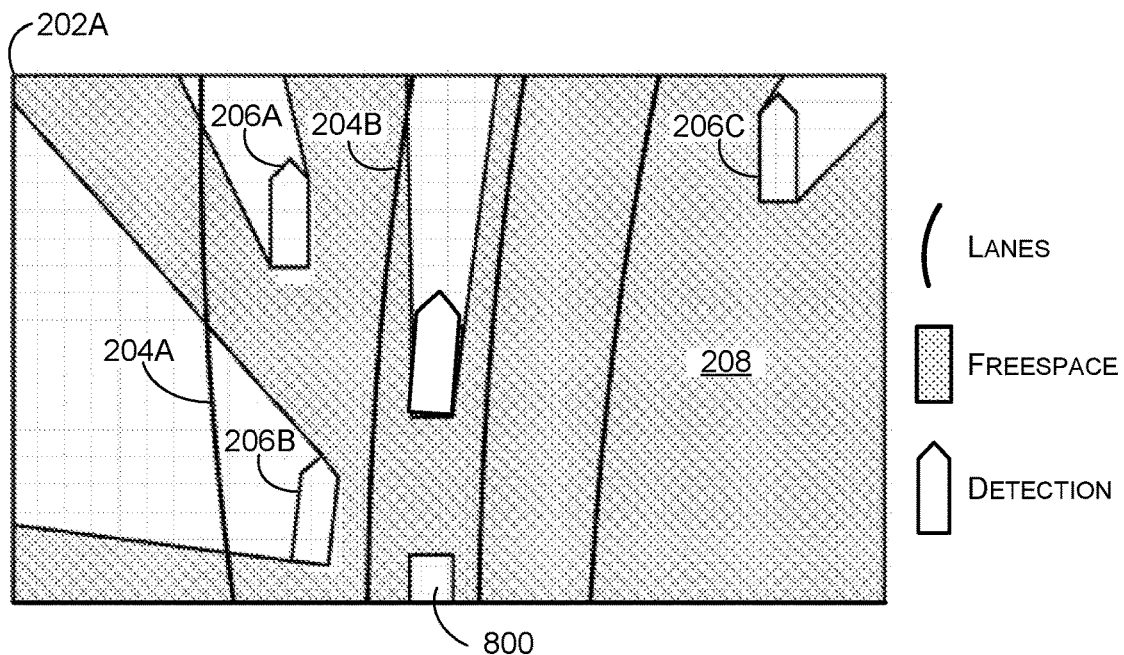
FIGS. 2A-2E are example visualizations of inputs to a multi-sensor fusion network, in accordance with some embodiments of the present disclosure.
Figure 2B:
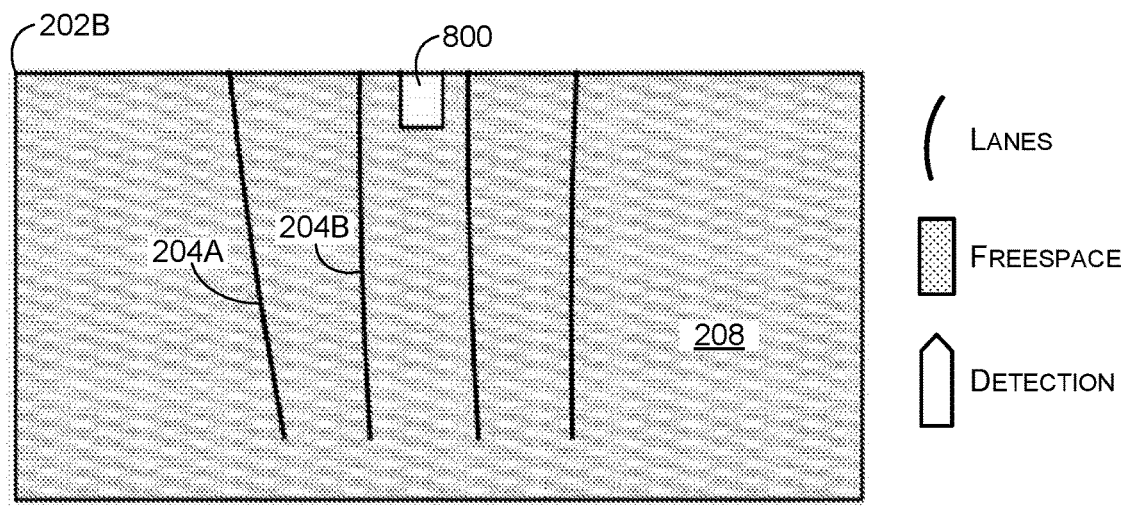

Non-limiting examples of input channels for different sensor types that may be included in input 2D or 3D signals are illustrated in FIG. 1B, where the various input signals 104, 108, 112, 114, 116, and/or 118 may include rasterized images representing one or more of the input channel types illustrated. Other examples of the 3D signals, such as where the 3D signals include rasterized images, are illustrated in FIGS. 2A and 2B. For example, FIG. 2A may represent a rasterized image 202A from a first sensor pipeline including a sensor with a field of view or sensory field in front of the ego-machine 800 and a second rasterized image 202B from a second sensor pipeline including a sensor with a field of view or sensory field behind the ego-machine 800. The rasterized images 202A and 202B may include representations of lane lines 204A, 204B, etc., object detections 206A, 206B, 206C, etc. (e.g., corresponding to vehicles, pedestrians, animals, bicyclists, debris, robots, etc.), and/or indications of freespace (e.g., pixels may be encoded as freespace or not freespace). As illustrated with respect to the detections 206, the detections may include bounding shapes indicating a location, shape, and/or orientation of the detected objects (e.g., where the point in the bounding shape indicates a direction of travel or orientated position). The object detections 206, lane lines 204, and/or other features or objects encoded in the rasterized images 202 may also include classification information, velocity information, and/or other information. As described herein, additional or alternative features or objects may be included in the rasterized images 202 other than those illustrated in FIGS. 2A-2B, such as wait conditions, road profile information (e.g., potholes, perturbations, speed bumps, etc.), and/or other information describing the surrounding environment.

In some embodiments, classification information corresponding to objects or features may be represented by intensity values. For example, if a classification is corresponding to an intensity value of x, an overlapping area of two objects will be x+1, three objects X+2, and so on. However, where there is overlap in objects, boundaries of objects may be encoded with an intensity value indicating a border, such as, without limitation, a max intensity value of 255 where the intensity values range from 0-255. As a result, boundaries between detected objects may be more easily identified.

Figure 2C:
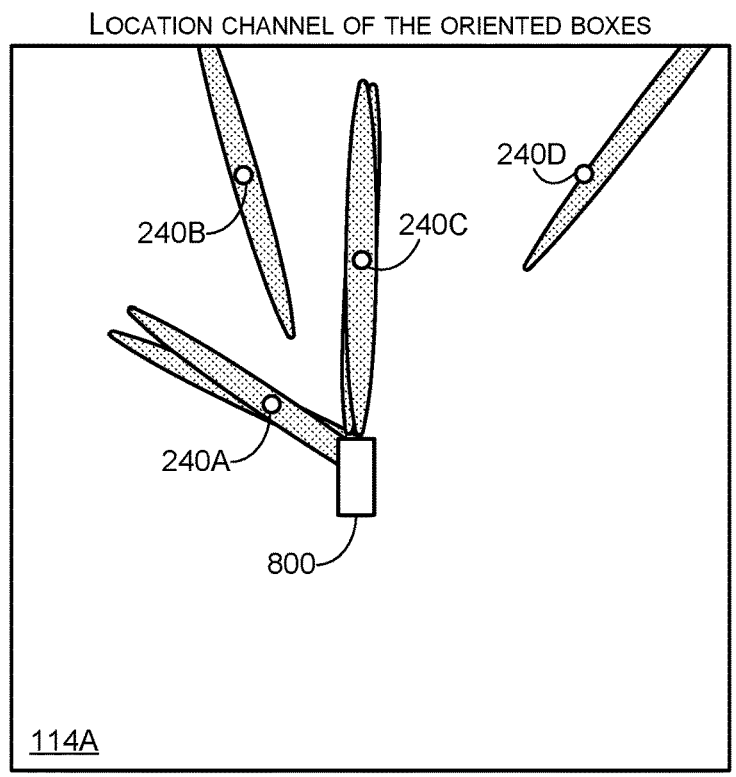
Figure 2D:
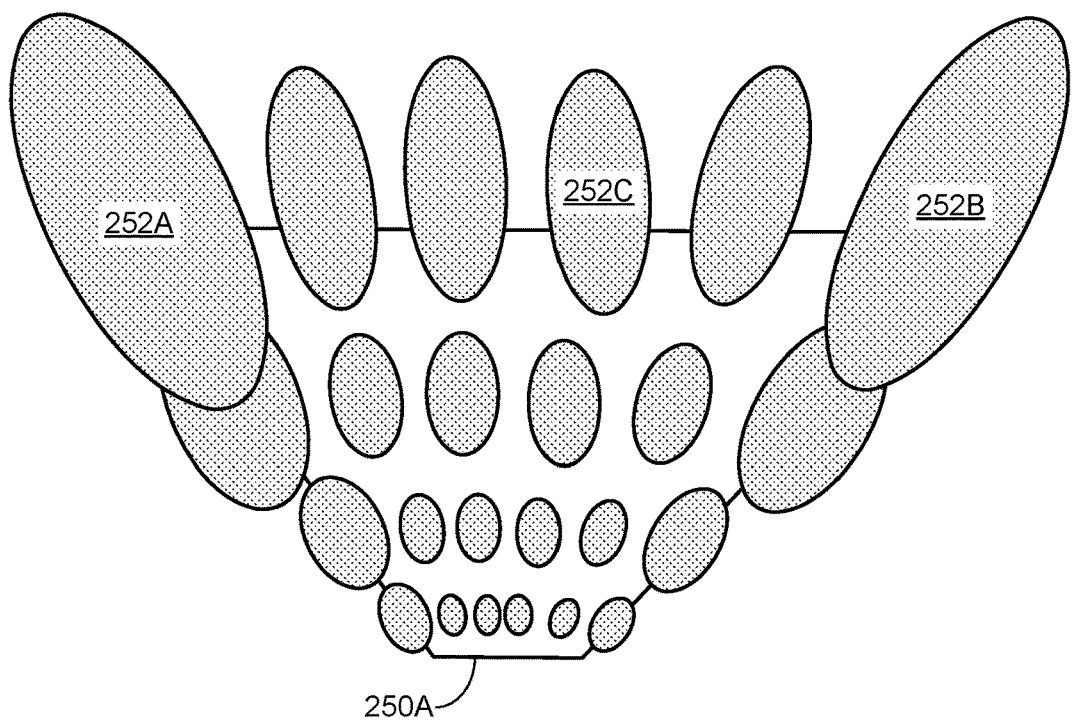
Figure 4A:
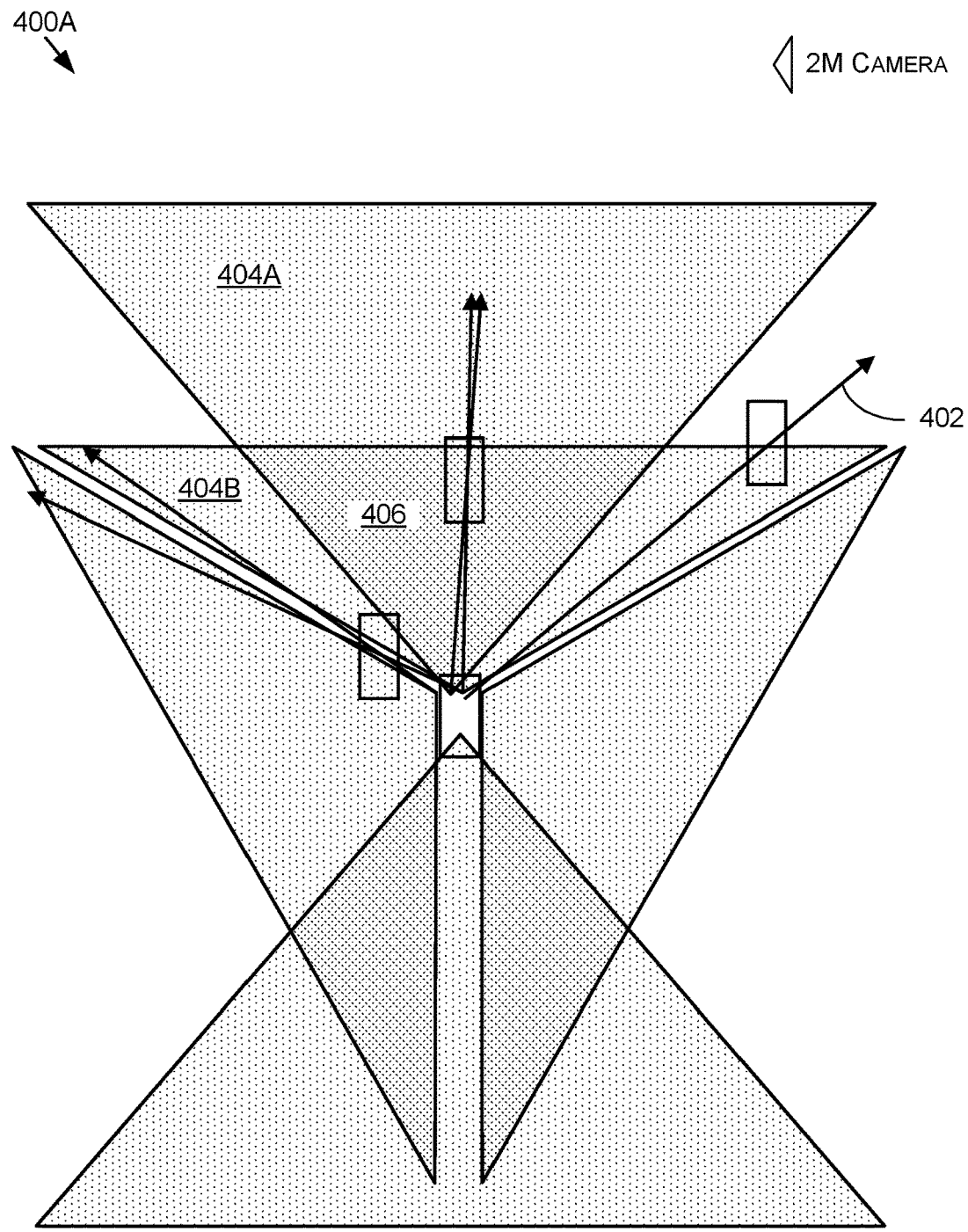
FIGS. 4A-4C are example visualizations of fields of view or sensor fields of various sensors of an ego-machine, and associated rays from the various sensors intersecting with perceived objects in an environment, in accordance with some embodiments of the present disclosure.
Figure 4B:
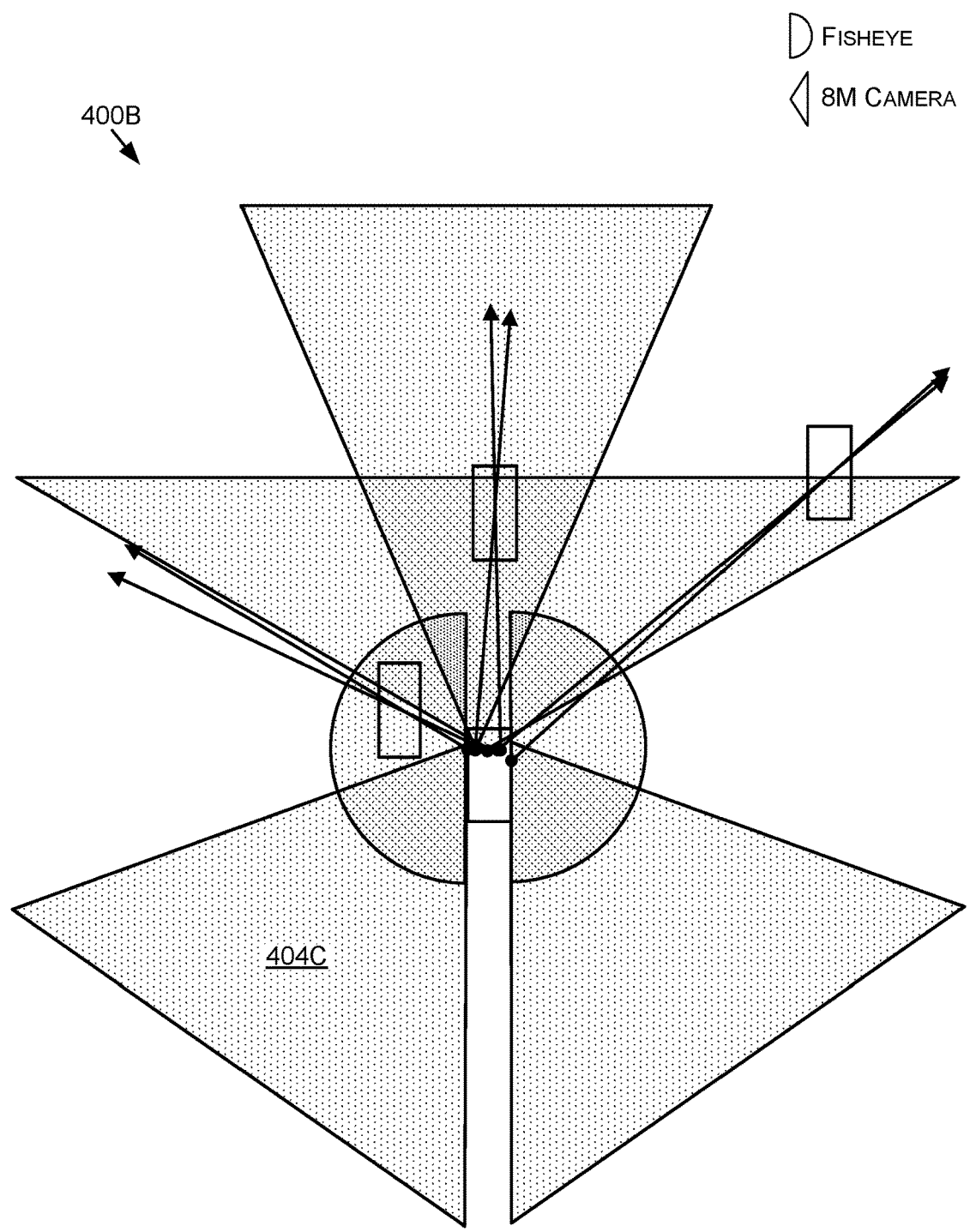
Figure 4C:
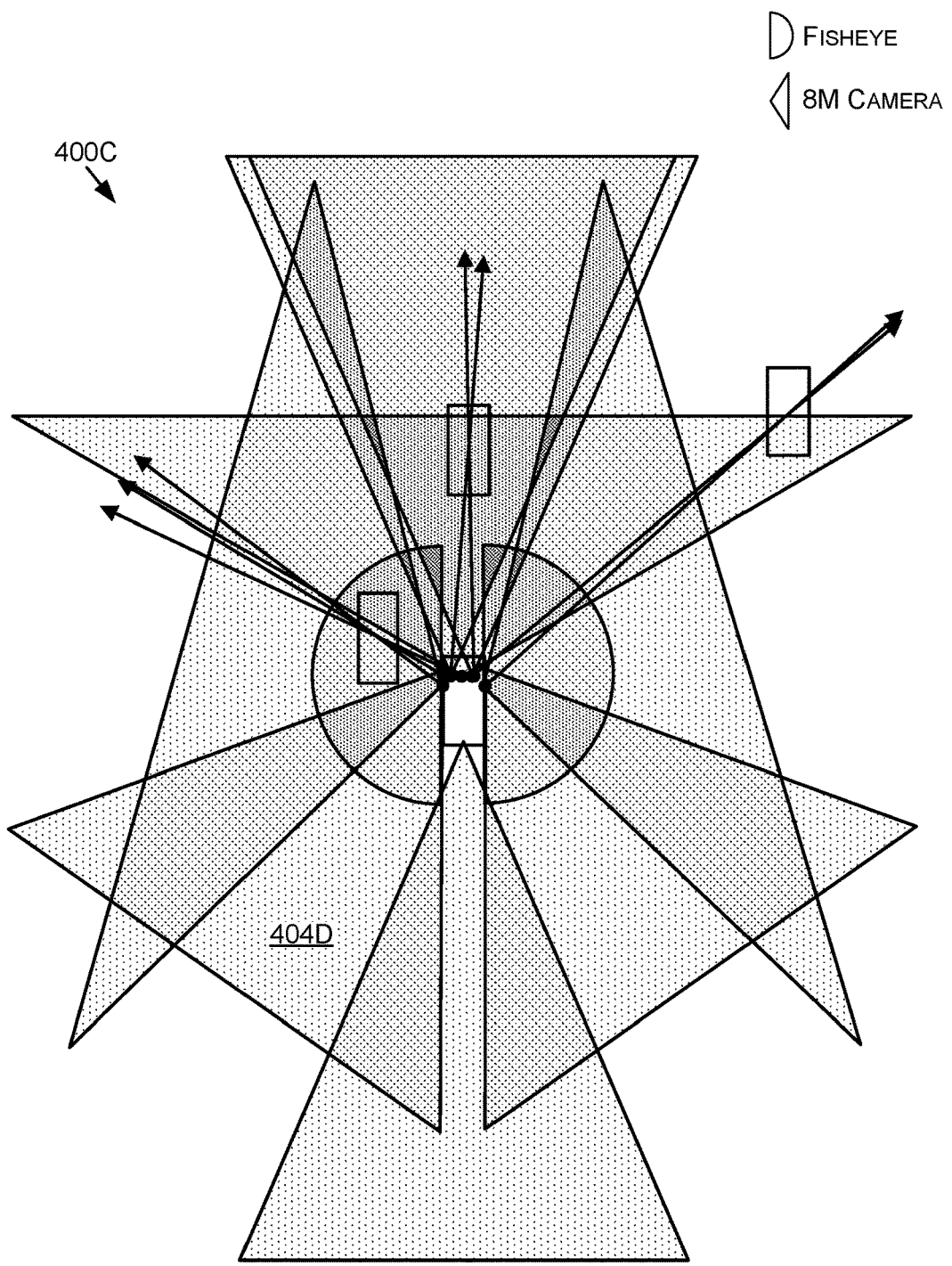

The different input 3D signals may correspond to different sensors with different fields of view or sensory fields. For example, as illustrated in FIGS. 4A-4C as well as in FIG. 8B, various different sensor configurations may be used to compute 3D signals corresponding to some or all of the surroundings of the ego-machine 800. For example, the fields of view or sensory fields (e.g., fields of view 404A, 404B, 404C, 404D, 404E as illustrated in FIGS. 4A-4C) may together make up a 360 degree field of view around the machine 800, or less than a 360 degree field of view around the machine 800, depending on the embodiment. In addition, in some embodiments, one or more of the 3D signals and thus the associated sensor(s) may include a 360 degree field of view or sensory field around the machine 800. For example, a spinning LiDAR sensor or a 360 surround camera may include a 360 degree field of view or sensory field, while a camera may include a 30 degree, 60 degree, 120 degree, and/or other field of view (e.g., up to 360 degrees, such as in a surround camera).

Where a sensor pipeline corresponds to a camera and/or other sensor type that does not directly compute depth, the 3D signals may still include a predicted depth value that is represented in the rasterized image or other input representation. For example, the individual DNNs used in the sensor data pipelines may be trained to predict depth using a single camera image, or may be trained to predict depth from inputs of two or more sensors with overlapping fields of view (e.g., such as fields of view 404A and 404B that may include overlap region 406 as illustrated in FIG. 4A). In some embodiments, a location prior image 114 may be generated as an additional input to the fusion DNN 120 that indicates to the fusion DNN 120 predicted depths—or a probability distribution function 252 (represented as a 2D Gaussian representation, in embodiments) indicating a distribution of potential depths—of an object based on the predicted depth from the 3D signal. For example, as illustrated in FIG. 2C, one or more sensors of an ego-machine 800 may detect objects 240A, 240B, 240C, 240D, etc., as illustrated by the circles in location prior image 114A. In such an example, where the object locations predictions are based on sensor data generated using monocular cameras or other sensor types where the accuracy of the location predictions may be less than ideal, a distribution of potential locations may be fed to the fusion DNN 120 to aid the fusion DNN 120 in generating more accurate predictions in the fused output 122. As such, the ellipses or probability distribution function (PDF) 252 representations corresponding to each object 240 may indicate potential locations—e.g., with corresponding confidence values—for where the object 240 may be located. For different sensor modalities, the corresponding ellipses or PDFs 252 may be of different shape. For example, because camera predictions may be along a ray (e.g., ray 402 of FIG. 4A), the ellipses or PDFs may be longer and narrower in shape (e.g., representing a bimodal distribution along the ray direction), while RADAR sensors may have representations that are shorter but wider to account for the respective inaccuracy or RADAR sensors, and so on. For example, FIG. 2D may illustrate different ellipses or PDFs 252 corresponding to RADAR sensor predictions within a field of view 250A of a RADAR sensor. In addition, the shape of the ellipses or PDF may differ depending on where in the field of view of the respective sensor the detection is located. For example, with reference to FIG. 2E, ellipses or PDFs near the edges of field of view 250B or 250C or further from the sensor may be different than in the center of the fields of view 250 or closer to the sensor—e.g., at the edges, the predictions may be less accurate than in the center, so the shape of the ellipses or PDFs 252 may be larger to indicate more variability. A similar representation is illustrated in FIG. 2D with respect to the field of view 250A.

Figure 2E:
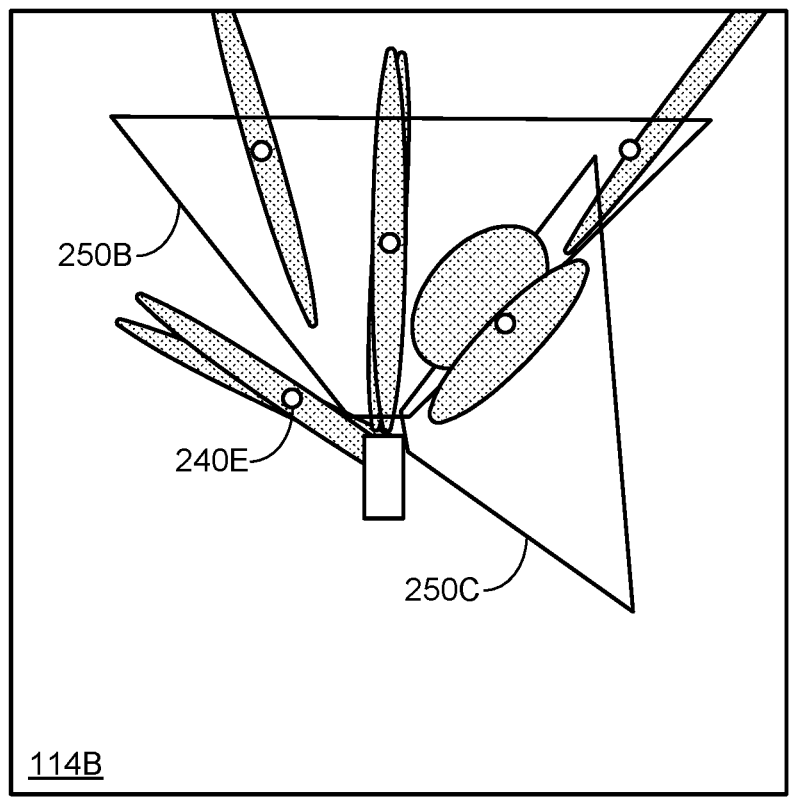

To generate the location prior image 114—such as the location prior image 114A of FIG. 2C or the location prior image 114B of FIG. 2E—a pixel or point (e.g., corresponding to a quantized 3D position) corresponding to a detected object as predicted using a sensor pipeline may be used to retrieve a corresponding learned or determined ellipse or PDF corresponding to that point or pixel within the field of view of the respective sensor. For example, FIG. 2D may represent a subset of the ellipses or PDFs for a field of view 250A of a particular sensor. Although the illustration includes a number of ellipses or PDFs 252A, 252B, 252C, etc., this is not intended to be limiting. For example, in some embodiments, each pixel or points representing a field of view may have a corresponding ellipse or PDF 252. In other embodiments, any number of the pixels or points may have a corresponding ellipse or PDF 252. These ellipses or PDFs 252 may be learned or determined based on historical predictions for the particular sensor, and the corresponding inaccuracies of those predictions. As such, when an object is detected for a particular sensor at a particular point(s) or pixel(s), the corresponding known ellipse or PDF 252 may be retrieved and inserted into the location prior image 114.

In some embodiments, as described herein, instead of or in addition to including one or more of the channels in the input signals for each pipeline, one or more of the channels may be used to generate separate input representations-such as a velocity image(s) 116, an instance/appearance image(s) 118, etc. For example, velocity information generated using one or more of the sensor pipelines may be used to generate one or more velocity images 116 and/or one or more instance/appearance image(s) 118—e.g., temporal instance/appearance images and/or spatial instance/appearance images. The velocity image(s) 116 may include one or more channels corresponding to velocity in an x direction, y direction, and so on. In some embodiments, as described herein, the velocity image(s) 116 may be generated based on outputs of one or more of the sensor pipelines. For example, one or more of the 3D signals from the sensor pipelines may include velocity information and, instead of or in addition to encoding this information in the rasterized image used as input to the fusion DNN 120, the velocity information may be used to generate one or more separate inputs corresponding to the velocity image(s) 116. As such, the velocity information may aid the fusion DNN 120 in determining whether closely located objects or features are the same object (e.g., similar or the same velocities) or different objects (e.g., different velocities), and thus how to represent the objects in the fused output 122—e.g., as a single object or as two or more objects.

As another example, an instance/appearance image(s) 118 may be used that correspond to instance and/or appearance spatial associations. For example, one or more of the sensor pipelines may generate outputs that indicate descriptors for features or objects. In such an example, one or more of the machine learning models in one or more of the sensor pipelines may be trained to produce N dimensional vectors for each bounding shape/2D cuboid/3D cuboid for objects—e.g., where N may equal 3, in embodiments. As a result, an N-D vector may be generated for one or more detected objects or features. As such, one or more vectors generated using one or more sensor pipelines may be compared to one another to determine how many object instances are present in a given frame. Where a first vector and a second vector are similar enough (e.g., within a threshold similarity), they may be determined to correspond to a same object, and this information may be represented in an instance/appearance image 118. Similarly, an instance and/or appearance image may be generated for temporal association between objects or features. For example, a recurrent neural network may be used to take input vectors or instance/appearance information across frames, and to generate an instance/appearance image 118 representing object instances across time. In either example, the instance/appearance image(s) 118 may be used as an additional input(s) for the fusion DNN 120 in computing the fused output 122. For example, the instance/appearance information may aid the fusion DNN 120 in determining whether closely located objects or features are the same object or different objects, and thus how to represent the objects in the fused output 122—e.g., as a single object or as two or more objects.

Figure 3B:
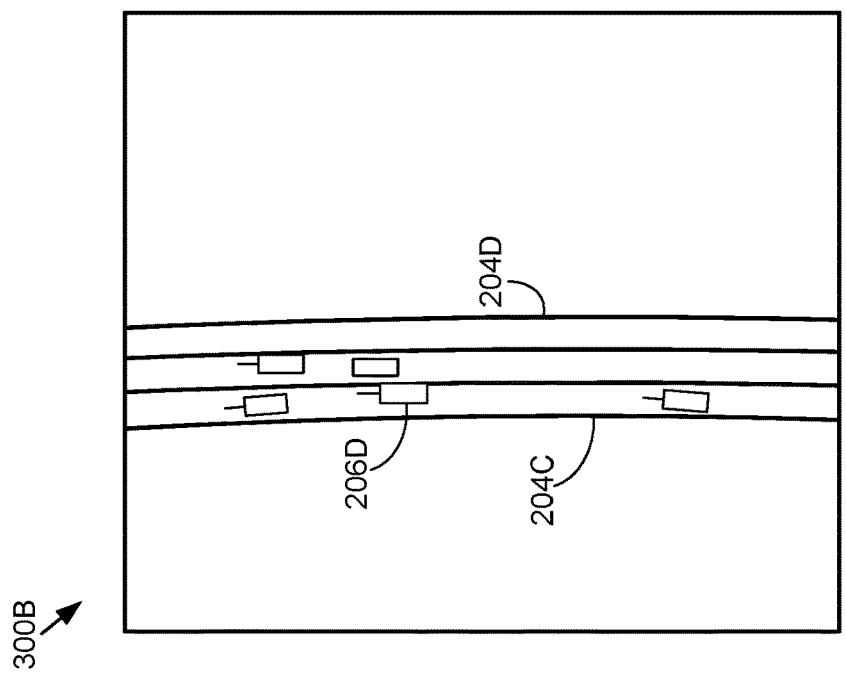
FIGS. 3A-3B are example visualizations of outputs of a multi-sensor fusion network, in accordance with some embodiments of the present disclosure.
Figure 3A:
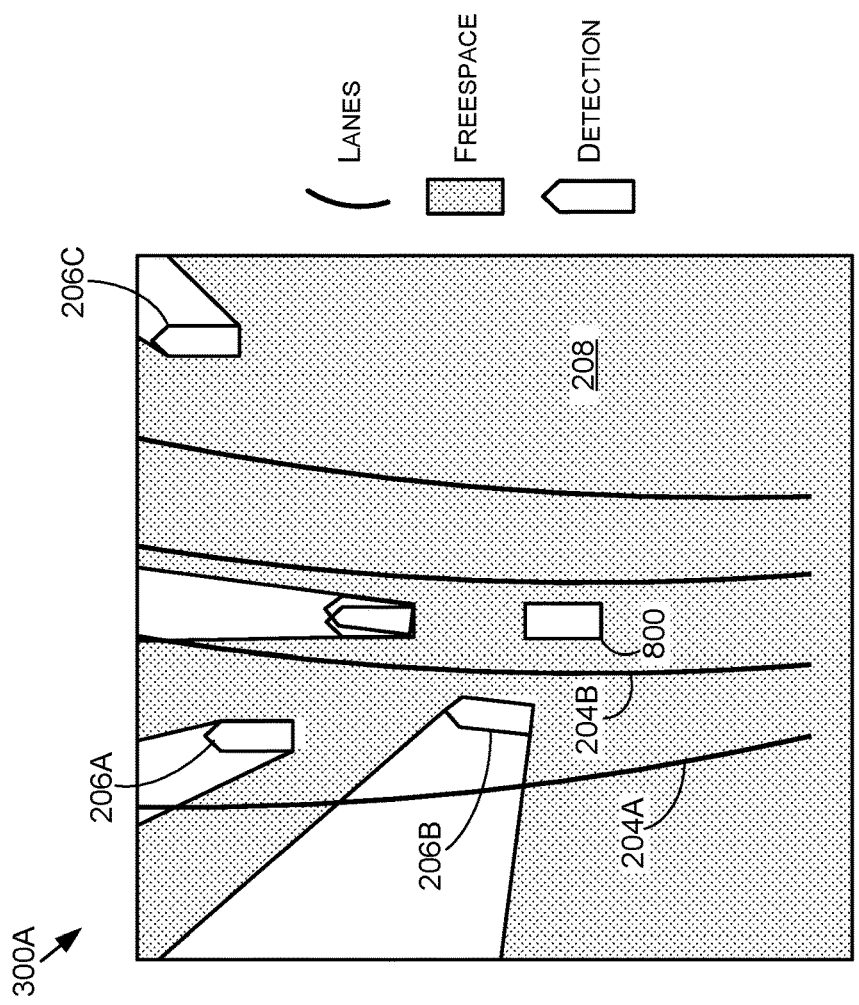

At each iteration of the fusion DNN 120, the 3D signals 104, 108, 112, etc., the location prior image(s) 114, the velocity image(s) 116, and/or the instance/appearance image(s) 118 may be provided as input to the fusion DNN 120. The fusion DNN 120 may process the inputs to generate the fused output 122—examples of which are illustrated in FIGS. 3A-3B. The fusion DNN 120 and/or one or more of the DNNs or machine learning models used to generate the 3D signal(s) may include may include, for example, and without limitation, any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In embodiments where the fusion DNN 120 and/or one or more of the DNNs or machine learning models used to generate the 3D signal(s) includes a convolutional neural network (CNN), one or more of the layers may include an input layer. The input layer may hold values associated with the various inputs. For example, when the input is an image(s) (e.g., a rasterized image corresponding to various channels from the 3D signals), the input layer may hold values representative of the raw pixel values of the image(s) as a volume (e.g., a width, W, a height, H, and color channels, C (e.g., RGB), such as 32×32×3), and/or a batch size, B (e.g., where batching is used)

One or more layers may include convolutional layers. The convolutional layers may compute the output of neurons connected to local regions in an input layer (e.g., the input layer), each neuron computing a dot product between their weights and a small region they are connected to in the input volume. A result of a convolutional layer may be another volume, with one of the dimensions based on the number of filters applied (e.g., the width, the height, and the number of filters, such as 32×32×12, if 12 were the number of filters).

One or more of the layers may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers may include a pooling layer. The pooling layer may perform a down-sampling operation along the spatial dimensions (e.g., the height and the width), which may result in a smaller volume than the input of the pooling layer (e.g., 16×16×12 from the 32×32×12 input volume). In some examples, the fusion DNN 120 and/or the other DNN(s) may not include any pooling layers. In such examples, strided convolution layers may be used in place of pooling layers. In some examples, the feature extractor layer(s) of the fusion DNN(s) 120 and/or the other DNN(s) (e.g., $F_1$, $F_2$, etc. from FIG. 6B) may include alternating convolutional layers and pooling layers, or may not include pooling layers at all.

One or more of the layers may include a fully connected layer. Each neuron in the fully connected layer(s) may be connected to each of the neurons in the previous volume. The fully connected layer may compute class scores, and the resulting volume may be 1×1×number of classes. In some example, no fully connected layers may be used by the fusion DNN 120 and/or the other DNN(s) as a whole, in an effort to increase processing times and reduce computing resource requirements. In such examples, where no fully connected layers are used, the fusion DNN 120 and/or the other DNN(s) may be referred to as a fully convolutional network.

One or more of the layers may, in some examples, include deconvolutional layer(s). However, the use of the term deconvolutional may be misleading and is not intended to be limiting. For example, the deconvolutional layer(s) may alternatively be referred to as transposed convolutional layers or fractionally strided convolutional layers. The deconvolutional layer(s) may be used to perform up-sampling on the output of a prior layer. For example, the deconvolutional layer(s) may be used to up-sample to a spatial resolution that is equal to the spatial resolution of the inputs (e.g., the spatial resolution of the 3D signals) to the fusion DNN 120 and/or the other DNN(s), or used to up-sample to the input spatial resolution of a next layer.

Although input layers, convolutional layers, pooling layers, ReLU layers, deconvolutional layers, and fully connected layers are discussed herein with respect to the fusion DNN 120, this is not intended to be limiting. For example, additional or alternative layers may be used, such as normalization layers, SoftMax layers, and/or other layer types.

Different orders and numbers of the layers of the fusion DNN 120 may be used depending on the embodiment. In addition, some of the layers may include parameters (e.g., weights and/or biases), while others may not, such as the ReLU layers and pooling layers, for example. In some examples, the parameters may be learned by the fusion DNN 120 during training. Further, some of the layers may include additional hyper-parameters (e.g., learning rate, stride, epochs, kernel size, number of filters, type of pooling for pooling layers, etc.)—such as the convolutional layer(s), the deconvolutional layer(s), and the pooling layer(s)—while other layers may not, such as the ReLU layer(s). Various activation functions may be used, including but not limited to, ReLU, leaky ReLU, sigmoid, hyperbolic tangent (tanh), exponential linear unit (ELU), etc. The parameters, hyper-parameters, and/or activation functions are not to be limited and may differ depending on the embodiment.

Figure 6A:
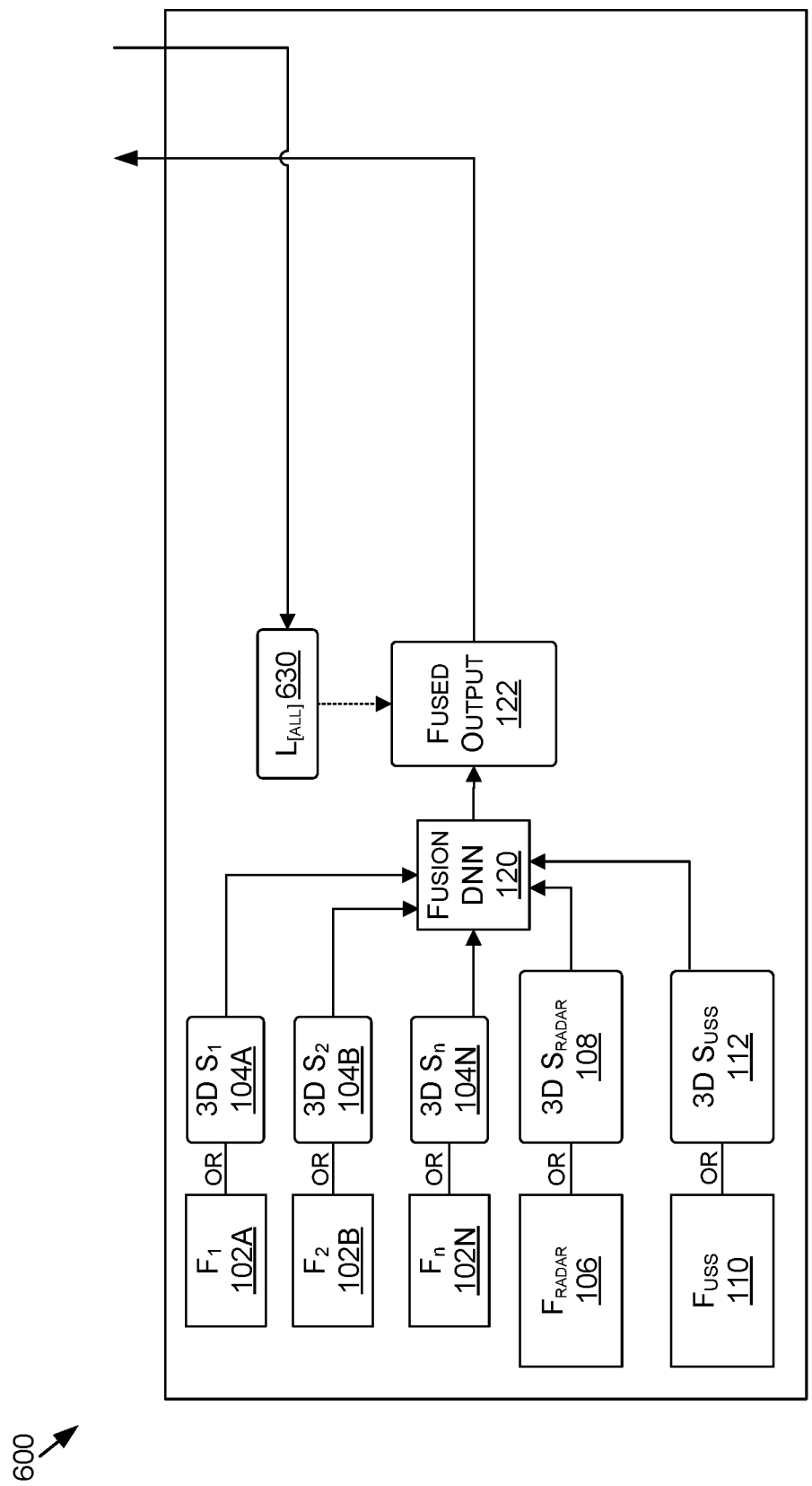
FIGS. 6A-6B represent a data flow diagram for a process of training a multi-sensor fusion network and one or more associated source networks, in accordance with some embodiments of the present disclosure.
Figure 6B:
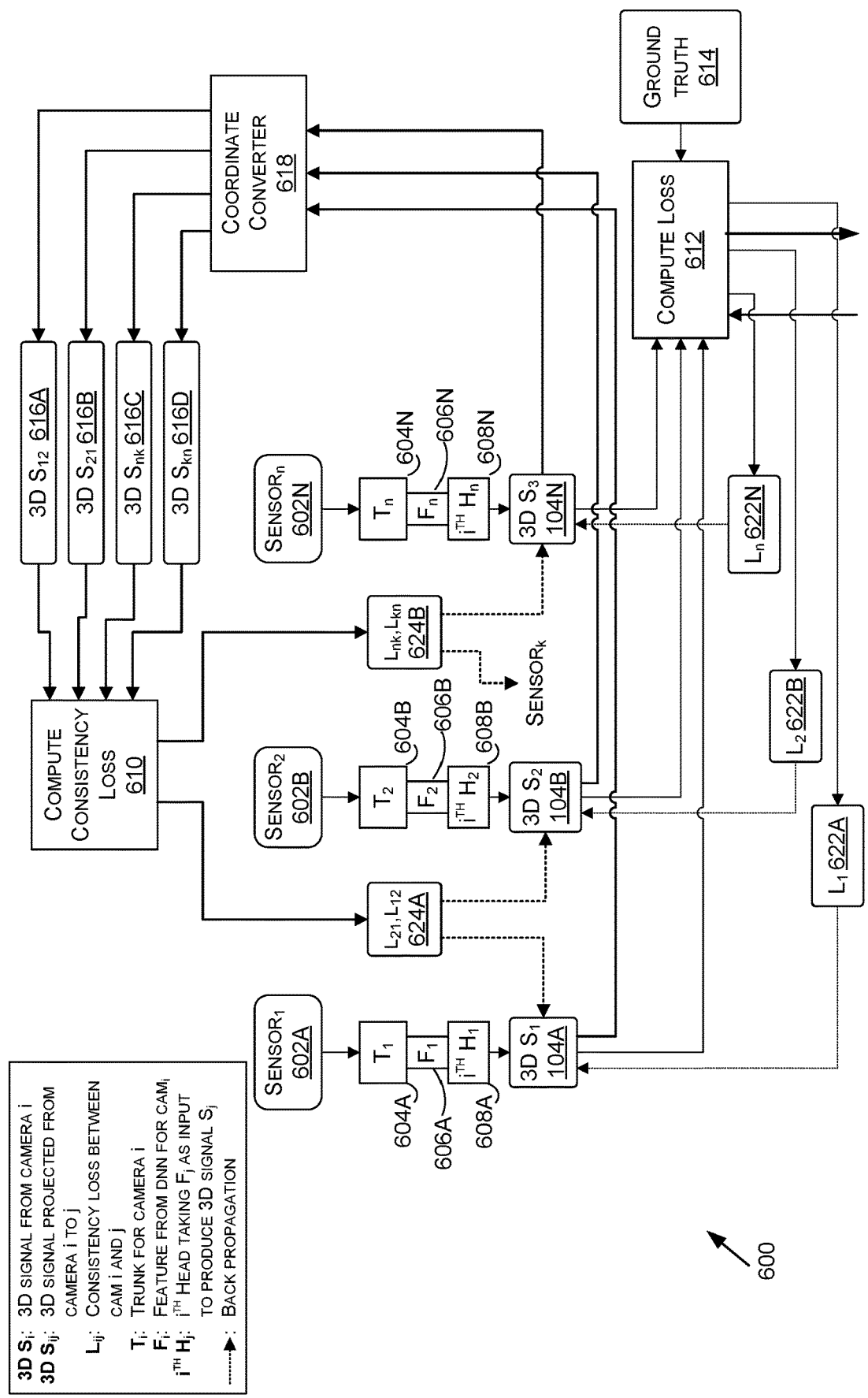

In some embodiments, as described with respect to FIG. 6B, one or more of the DNN(s) used to generate the 3D signals may include a trunk, T, feature extractor layers, F, and/or a head, H, that may be used to generate the 3D signals 104, 108, 112, etc. In examples, and as described herein, in addition to or alternatively from using the 3D signals 104, 108, 112, etc. generated from the individual input sources, the fusion DNN 120 may take outputs of the feature extractor layers (e.g., $F_1$-$F_n$ in FIG. 1A) directly as inputs to generate the fused output 122. In such examples, the feature extractor layers of the individual DNNs may be directly connected to one or more layers of the fusion DNN(s) 120 such that, during training, backpropagation from the fusion DNN 120 may be carried through to the individual DNN(s) to train the individual DNN(s) and the fusion DNN 120 together.

The fusion DNN 120 may generate the fused output 122 using the outputs of one or more layers of the individual DNN(s), the 3D signals 104, 108, 112, etc., the location prior image(s) 114, the velocity image(s) 116, and/or the instance appearance image(s) 118. The fused output 122 may be similar, in embodiments, to the 3D signals—e.g., the fused output 122 may include data representative of or that can be used to generate a rasterized image (e.g., similar to those illustrated in FIGS. 3A-3B). For example, the fused output may represent a top-down birds-eye view image, projection image, such as range images, side-view image, etc. that encodes any number of output channels (e.g., similar to one or more of the input channels described with respect to FIGS. 1A-1B). The fused output rasterized image computed using the fusion DNN may be ego-centric, in embodiments, where the ego-machine 800 is at the center of the representation. The fused output 122 may include a fused representation of one or more fields of view or sensor fields of the one or more input sources. For example, where the rasterized image of FIG. 2A includes a field of view of a forward facing camera and the rasterized image of FIG. 2B includes a field of view of a rear facing camera, fused output 300A of FIG. 3A may represent both the rasterized image of FIG. 2A and the rasterized image of FIG. 2B. FIG. 3B may include another visualization of a fused output 300B that includes objects 206 (including object 206D) and lanes 204 (including lanes 204C and 204D).

The illustrations of FIGS. 2A, 2B, and 3A are for example purposes only, and not intended to be limiting. For example, the 3D signals may represent smaller and/or larger portions of the surrounding environment of the ego-vehicle 800 depending on the embodiment, and may represent a fusion of any number of input sources. In addition, one or more of the 3D signals may include a field of view or sensory field that overlaps with the field of view or sensory field of one or more other 3D signals such that the fusion DNN 120 may learn to more accurately predict distance using, e.g., stereo camera functionalities.

The fused output 122 may be used by an autonomous driving software stack ("drive stack") 124 to perform one or more operations by the vehicle 800 (and/or other ego-machine type). For example, the drive stack 124 may include a world model manager that may be used to generate, update, and/or define a world model. The world model manager may use information generated by and received from the perception component(s) of the drive stack 124. The perception component(s) may include an obstacle perceiver, a path perceiver, a wait perceiver, a map perceiver, and/or other perception component(s). For example, the world model may be defined, at least in part, based on affordances for obstacles, paths, and wait conditions that can be perceived in real-time or near real-time by the obstacle perceiver, the path perceiver, the wait perceiver, and/or the map perceiver. The world model manager may continually update the world model based on newly generated and/or received inputs (e.g., data) from the obstacle perceiver, the path perceiver, the wait perceiver, the map perceiver, and/or other components of the ego-machine 800. For example, the world model manager and/or the perception components may use the fused output 122 to perform one or more operations.

The world model may be used to help inform planning component(s), control component(s), obstacle avoidance component(s), and/or actuation component(s) of the drive stack 124. The obstacle perceiver may perform obstacle perception that may be based on where the vehicle 800 is allowed to drive or is capable of driving, and how fast the vehicle 800 can drive without colliding with an obstacle (e.g., an object, such as a structure, entity, vehicle, etc.) that is sensed by the vehicle 800 (and represented in the fused output 122, for example).

The path perceiver may perform path perception, such as by perceiving nominal paths that are available in a particular situation. In some examples, the path perceiver may further take into account lane changes for path perception. A lane graph may represent the path or paths available to the vehicle 800, and may be as simple as a single path on a highway on-ramp. In some examples, the lane graph may include paths to a desired lane and/or may indicate available changes down the highway (or other road type), or may include nearby lanes, lane changes, forks, turns, cloverleaf interchanges, merges, and/or other information.

The wait perceiver may be responsible to determining constraints on the vehicle 800 as a result of rules, conventions, and/or practical considerations. For example, the rules, conventions, and/or practical considerations may be in relation to traffic lights, multi-way stops, yields, merges, toll booths, gates, police or other emergency personnel, road workers, stopped busses or other vehicles, one-way bridge arbitrations, ferry entrances, etc. In some examples, the wait perceiver may be responsible for determining longitudinal constraints on the vehicle 800 that require the vehicle to wait or slow down until some condition is true. In some examples, wait conditions arise from potential obstacles, such as crossing traffic in an intersection, that may not be perceivable by direct sensing by the obstacle perceiver, for example (e.g., by using sensor data from the sensors, because the obstacles may be occluded from field of views of the sensors). As a result, the wait perceiver may provide situational awareness by resolving the danger of obstacles that are not always immediately perceivable through rules and conventions that can be perceived and/or learned. Thus, the wait perceiver may be leveraged to identify potential obstacles and implement one or more controls (e.g., slowing down, coming to a stop, etc.) that may not have been possible relying solely on the obstacle perceiver.

The map perceiver may include a mechanism by which behaviors are discerned, and in some examples, to determine specific examples of what conventions are applied at a particular locale.

The planning component(s) may include a route planner, a lane planner, a behavior planner, and a behavior selector, among other components, features, and/or functionality. The route planner may use the information from the map perceiver, the map manager, and/or the localization manger, among other information, to generate a planned path that may consist of GNSS waypoints (e.g., GPS waypoints). The waypoints may be representative of a specific distance into the future for the vehicle 800, such as a number of city blocks, a number of kilometers/miles, a number of meters/feet, etc., that may be used as a target for the lane planner.

The lane planner may use the lane graph (e.g., the lane graph from the path perceiver, which may be generated using, at least in part, the fused output 122), object poses within the lane graph (e.g., according to the localization manager), and/or a target point and direction at the distance into the future from the route planner as inputs. The target point and direction may be mapped to the best matching drivable point and direction in the lane graph (e.g., based on GNSS and/or compass direction). A graph search algorithm may then be executed on the lane graph from a current edge in the lane graph to find the shortest path to the target point.

The behavior planner may determine the feasibility of basic behaviors of the vehicle 800, such as staying in the lane or changing lanes left or right, so that the feasible behaviors may be matched up with the most desired behaviors output from the lane planner. For example, if the desired behavior is determined to not be safe and/or available, a default behavior may be selected instead (e.g., default behavior may be to stay in lane when desired behavior or changing lanes is not safe).

The control component(s) may follow a trajectory or path (lateral and longitudinal) that has been received from the behavior selector of the planning component(s) as closely as possible and within the capabilities of the vehicle 800.

The obstacle avoidance component(s) may aid the autonomous vehicle 800 in avoiding collisions with objects (e.g., moving and stationary objects). In some examples, the obstacle avoidance component(s) may be used independently of components, features, and/or functionality of the vehicle 800 that is required to obey traffic rules and drive courteously. In such examples, the obstacle avoidance component(s) may ignore traffic laws, rules of the road, and courteous driving norms in order to ensure that collisions do not occur between the vehicle 800 and any objects. As such, the obstacle avoidance layer may be a separate layer from the rules of the road layer, and the obstacle avoidance layer may ensure that the vehicle 800 is only performing safe actions from an obstacle avoidance standpoint. The rules of the road layer, on the other hand, may ensure that vehicle obeys traffic laws and conventions, and observes lawful and conventional right of way.

In any example, one or more of the layers, components, features, and/or functionality of the drive stack 124 may use the fused output 122 to generate outputs for world model management, planning, control, actuation, collision or obstacle avoidance, and/or the like to aid the ego-machine 800 in navigating the environment.

Figure 5:
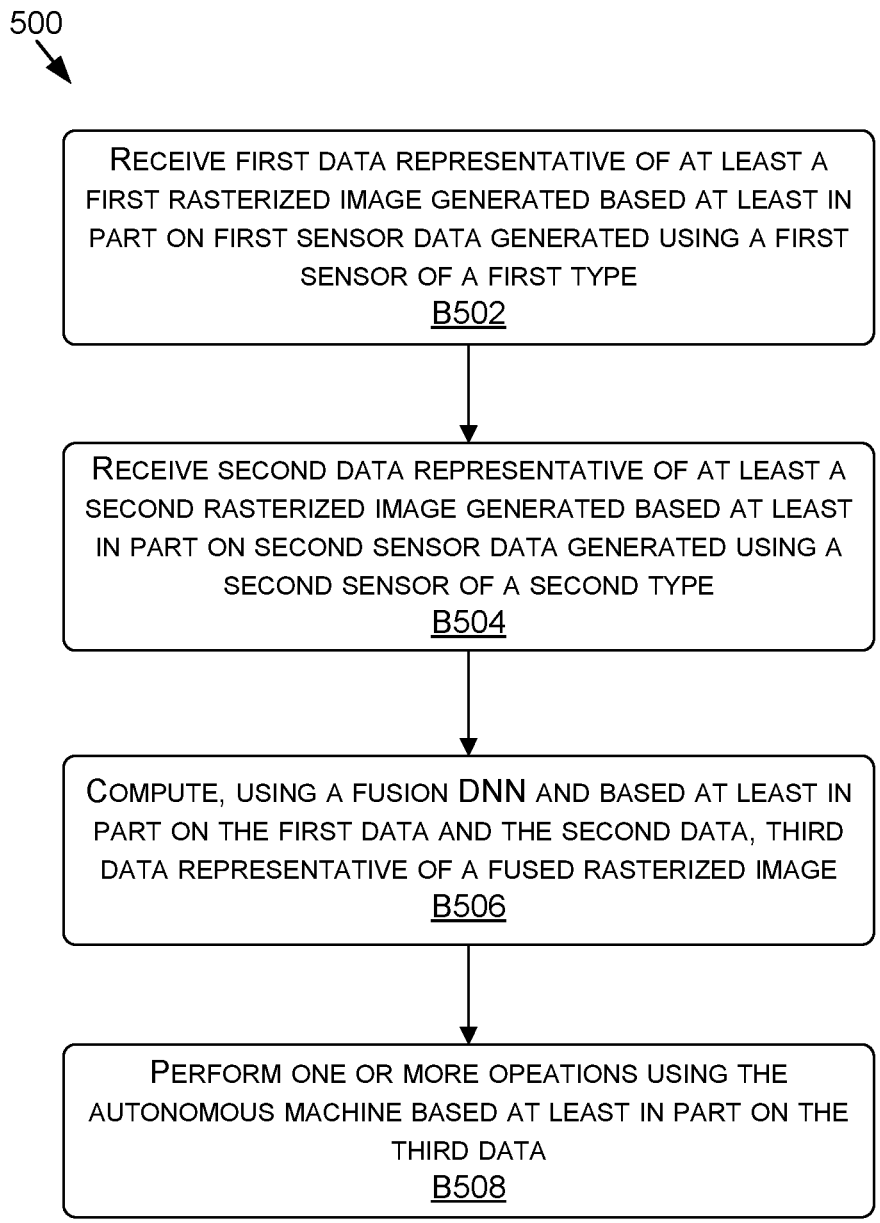
FIG. 5 is a flow diagram illustrating a method for using a multi-sensor fusion network to compute a fused output using a plurality of input channels, in accordance with some embodiments of the present disclosure.

Now referring to FIG. 5, each block of method 500, described herein, comprises a computing process that may be performed using any combination of hardware, firmware, and/or software. For instance, various functions may be carried out by a processor executing instructions stored in memory. The method 500 may also be embodied as computer-usable instructions stored on computer storage media. The method 500 may be provided by a standalone application, a service or hosted service (standalone or in combination with another hosted service), or a plug-in to another product, to name a few. In addition, method 500 is described, by way of example, with respect to the processes 100A and 100B of FIGS. 1A-1B. However, this method 500 may additionally or alternatively be executed within any one process by any one system, or any combination of processes and systems, including, but not limited to, those described herein.

FIG. 5 is a flow diagram illustrating a method 500 for using a multi-sensor fusion network to compute a fused output using a plurality of input channels, in accordance with some embodiments of the present disclosure. The method 500, at block B502, includes receiving first data representative of at least a first rasterized image generated based at least in part on first sensor data generated using a first sensor of a first type. For example, a first 3D signal 104, 108, 112, etc. may be generated using a first sensor pipeline.

The method 500, at block B504, includes receiving second data representative of at least a second rasterized image generated based at least in part on second sensor data generated using a second sensor of a second type. For example, a second 3D signal 104, 108, 112, etc. may be generated using a second sensor pipeline.

The method 500, at block B506, includes computing, using a fusion DNN and based at least in part on the first data and the second data, third data representative of a fused rasterized image. For example, the fusion DNN 120 may compute the fused output 122 using the first 3D signal, the second 3D signal, and/or one or more other 3D signals. In some embodiments, as described herein, addition to or alternative from using the 3D signals as input, the fusion DNN 120 may use output of one or more feature extractor layers of one or more individual DNNs corresponding to one or more of the sensor pipelines.

The method 500, at block B508, includes performing one or more operations using the autonomous machine based at least in part on the third data. For example, the drive stack 124 of the ego-machine 800 may use the fused output 122 to perform one or more operations, such as world model management, planning, control, actuation, obstacle avoidance, and/or the like.

With reference to FIGS. 6A-6B, FIGS. 6A-6B together represent a data flow diagram for a process 600 of training a multi-sensor fusion network and one or more associated source networks, in accordance with some embodiments of the present disclosure. For example, with reference to FIG. 6B, individual sensor pipelines may include individual or source DNNs that include, for example, one or more trunk layers 604 (e.g., trunk layer(s) 604A, 604B, and 604N), one or more feature extractor layers 606 (e.g., feature extractor layer(s) 606A, 606B, and 606N), and/or one or more heads or output layers 608 (e.g., output heads 608A, 608B, and 608N). The sensor pipelines may include sensors 602 (e.g., sensors 602A, 602B, and 602N) that generate sensor data— such as any of the sensor data described herein with respect to FIGS. 1A-1B—that may be processed using the source DNNs to generate the 3D signals (e.g., 3D signals 104A, 104B, and 104N). For example, the sensors may include cameras, LiDAR sensors, RADAR sensors, ultrasonic sensors, and/or other sensor types that may be used to generate sensor data for the individual DNNs. The 3D signals output by the source DNNs may be compared to ground truth data 614 using one more loss functions to compute loss 612 corresponding to the source DNNs. The ground truth data 614 may be generated using map data (e.g., from an HD map, or other map type, such as those used for localization) that may indicate locations of static features or objects such as lane lines, wait conditions, signs, fixed objects, and/or the like. In some embodiments, the ground truth 614 may be generated using a 2D or 3D ground truth generation pipeline, such as described in U.S. Non-Provisional application Ser. No. 17/187,350, filed on Feb. 26, 2021, which is hereby incorporated by reference in its entirety. The ground truth data 614 may include rasterized images including any of the channels described with respect to the 3D signals 104, 108, 112, etc. in FIGS. 1A-1B. For example, output 3D signals 104 of the source DNNs may correspond to rasterized images, or may be used to generate rasterized images, and the rasterized images may be compared to ground truth rasterized images to compute losses 622 (e.g., losses 622A, 622B, and 622N). These losses may be used to updated parameters (e.g., weights and biases) of the source DNNs using, e.g., backpropagation, to aid in training the DNN(s) until they converge to an acceptable level of accuracy or precision.

In addition to or alternatively from computing losses 622 using the ground truth data 614, photometric consistency loss may be computed at 610 to compare output 3D signals 104 from two or more source DNNs that have sensors 602 with at least partially overlapping fields of view. For example, similar to generating disparity maps for stereo cameras, photometric consistency losses 624 (e.g., loss 624A between 3D signal 104A and 3D signal 104B and/or 3D signal 104B and 3D signal 104A, loss 624B between 3D signal 104N and 3D signal 104K and/or 3D signal 104K and 3D signal 104N, etc.) may be computed to compare the outputs of two or more source DNNs in order to ensure consistency at least in the portions of the fields of view or sensor fields that overlap (e.g., overlap 406 of FIG. 4A). As such, with respect to 3D signal 104A and 3D signal 104B, the coordinate converter 618 may convert the 3D signal 104A to a coordinate space of the 3D signal 104B to generate 3D signal 616A, and then compute consistency loss 624A by comparing the converted 3D signal 616A to the 3D signal 104B to determine the consistency—or lack thereof—between the signals. As such, where an overlap region is inconsistent—e.g., an object in the converted 3D signal 616A is different (e.g., in location, depth, orientation, class, etc.) from the same object in the 3D signal 104B, the loss 624A may be higher and the source DNNs corresponding to the 3D signal 104A and/or the 3D signal 104B may be penalized (e.g., the parameters may be updated). This process may be executed similarly by converting the 3D signal 104B to the coordinate space of the 3D signal 104A using the coordinate converter 618 to generate 3D signal 616B, by converting the 3D signal 104N to the coordinate space of the 3D signal 104K using the coordinate converter 618 to generate 3D signal 616C, by converting the 3D signal 104K to the coordinate space of the 3D signal 104N using the coordinate converter 618 to generate 3D signal 616D, and so on. As such, by computing the losses 622 and/or the losses 624, the source DNNs may be trained until they reach an acceptable level of accuracy or precision.

A benefit of training the source DNN(s) separately from the fusion DNN 120 is that sensor data or simulated sensor data used in training does not need to rely on photorealistic renderings of input images. For example, because the 3D signals 104, 108, 112, etc. may represent rasterized images generated using various channels, the rasterized images used for training may be generated without requiring photorealistic sensor data—e.g., because the inputs to the fusion DNN 120 are the rasterized images.

Similarly, and with respect to FIGS. 6A and 6B, the fused outputs 122 of the fusion DNN 120 may be compared to the ground truth data 614 corresponding to the fused outputs to compute loss 630. The ground truth data 614 for the fused output 122 may be generated using similar techniques or data as the ground truth data 614 for the source DNNs. As such, the loss 630 may be used to update parameters of the fusion DNN 120 until the fusion DNN 120 converges to an acceptable level of accuracy or precision. Although the other input types-such as the location prior channel 114, the velocity image(s) 116, and/or the instance/appearance image(s) 118 are not illustrated in FIGS. 6A-6B, this is not intended to be limiting, and in some embodiments, one or more of these input channel(s) may also be supplied as input to the fusion DNN 120 at each training iteration.

Figure 6C:
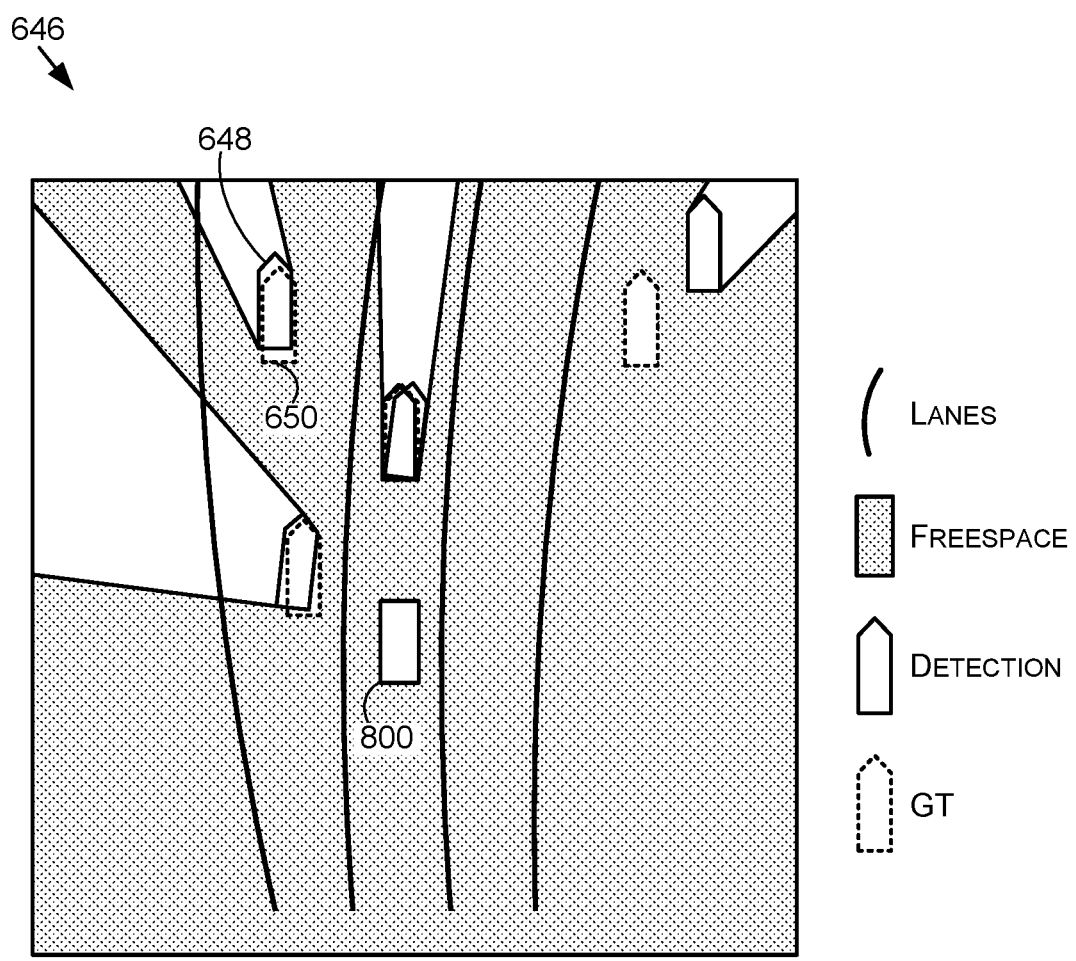
FIG. 6C is an example of ground truth data used for training a multi-sensor fusion network, in accordance with some embodiments of the present disclosure.

For example, and with respect to FIG. 6C, a fused output 646 may include an object 648, and ground truth data 614 may indicate an actual location of the object as ground truth object 650. In such an example, the computed loss 630 may be represent this difference, and the parameters of the fusion DNN 120 may be updated. In examples where the 3D signals from the source DNNs correspond to rasterized images (e.g., including less or equal amount of a surrounding environment of the ego-machine 800), the losses 622 may be computed similarly using the corresponding rasterized images of the 3D signals.

In some embodiments, as described herein, the inputs to the fusion DNN 120 may correspond to the feature outputs 102—e.g., outputs of the feature extractor layers 606 of the source DNNs-such that layers of the source DNNs may correspond to separate input trunks or streams of layers for the fusion DNN 120. In such examples, connections between nodes of feature extractor layers 606 of the source DNNs and nodes of a layer(s) (e.g., an input layer) of the fusion DNN 120 may be connected. As such, the fusion DNN 120 and the source DNN(s) may be trained at the same time, such that loss computed for the fusion DNN 120 may be backpropagated through to the source DNN(s).

Now referring to FIG. 6, each block of method 700, described herein, comprises a computing process that may be performed using any combination of hardware, firmware, and/or software. For instance, various functions may be carried out by a processor executing instructions stored in memory. The method 700 may also be embodied as computer-usable instructions stored on computer storage media. The method 700 may be provided by a standalone application, a service or hosted service (standalone or in combination with another hosted service), or a plug-in to another product, to name a few. In addition, method 700 is described, by way of example, with respect to the process 600 of FIGS. 6A-6B. However, this method 700 may additionally or alternatively be executed within any one process by any one system, or any combination of processes and systems, including, but not limited to, those described herein.

Figure 7:
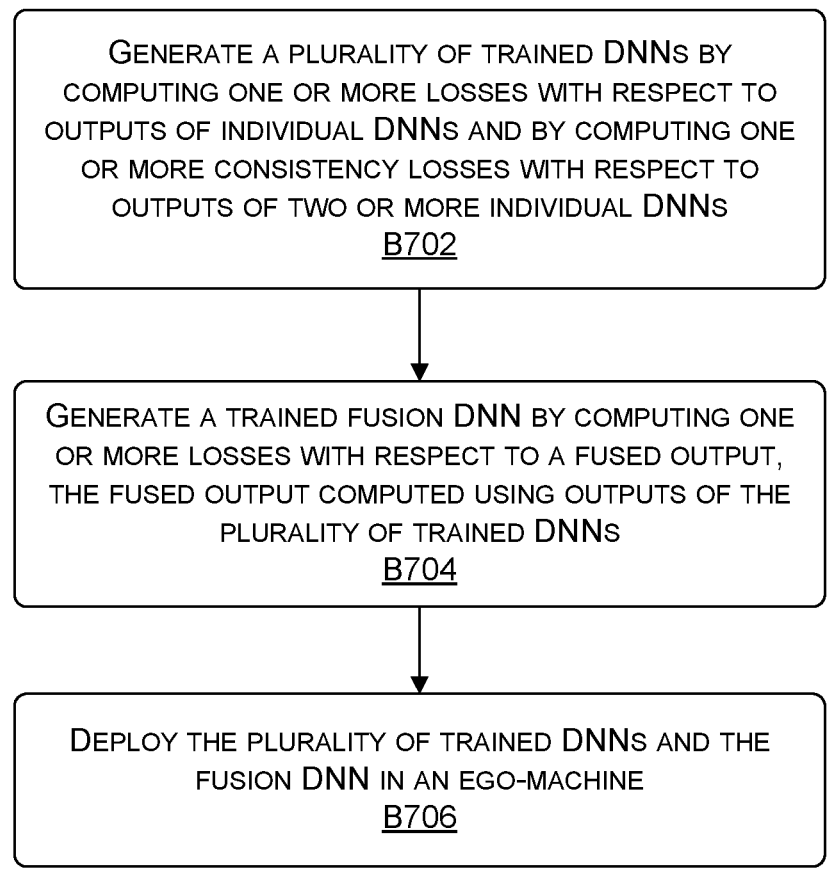
FIG. 7 is a flow diagram illustrating a method for training a multi-sensor fusion network to compute a fused output using a plurality of input channels, in accordance with some embodiments of the present disclosure.

FIG. 7 is a flow diagram illustrating a method 700 for training a multi-sensor fusion network to compute a fused output using a plurality of input channels, in accordance with some embodiments of the present disclosure. The method 700, at block B702, includes generating a plurality of trained DNNs by computing one or more losses with respect to outputs of individual DNNs and by computing one or more consistency losses with respect to outputs of two or more of the individual DNNs. For example, the source DNNs may be trained using the ground truth data 614 to generate the losses 622 and may be trained using photometric consistency losses 624.

The method 700, at block B704, includes generating a trained fusion DNN by computing one or more losses with respect to a fused output, the fused output computed using outputs of the plurality of trained DNNs. For example, once trained, the source DNNs may compute outputs, and these outputs may be used as input to the fusion DNN 120 to train the fusion DNN 120. For example, the fusion DNN 120 may compute the fused output(s) 122 and the fused output(s) 122 may be compared against ground truth data 614 to compute the loss(es) 630. In some examples, the fusion DNN 120 may be trained additionally or alternatively using simulated or fabricated data—e.g., rasterized images-without using actual outputs of the source DNNs.

The method 700, at block B706, includes deploying the plurality of trained DNNs and the fusion DNN in an ego-machine. For example, once trained, the fusion DNN 120 and the source DNNs may be deployed in the ego-machine 800.

Example Autonomous Vehicle

FIG. 8A is an illustration of an example autonomous vehicle 800, in accordance with some embodiments of the present disclosure. The autonomous vehicle 800 (alternatively referred to herein as the "vehicle 800") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, a vehicle coupled to a trailer, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 800 may be capable of functionality in accordance with one or more of Level 3-Level 5 of the autonomous driving levels. For example, the vehicle 800 may be capable of conditional automation (Level 3), high automation (Level 4), and/or full automation (Level 5), depending on the embodiment.

The vehicle 800 may include components such as a chassis, a vehicle body, wheels (e.g., 2, 4, 6, 8, 18, etc.), tires, axles, and other components of a vehicle. The vehicle 800 may include a propulsion system 850, such as an internal combustion engine, hybrid electric power plant, an all-electric engine, and/or another propulsion system type. The propulsion system 850 may be connected to a drive train of the vehicle 800, which may include a transmission, to enable the propulsion of the vehicle 800. The propulsion system 850 may be controlled in response to receiving signals from the throttle/accelerator 852.

A steering system 854, which may include a steering wheel, may be used to steer the vehicle 800 (e.g., along a desired path or route) when the propulsion system 850 is operating (e.g., when the vehicle is in motion). The steering system 854 may receive signals from a steering actuator 856. The steering wheel may be optional for full automation (Level 5) functionality.

The brake sensor system 846 may be used to operate the vehicle brakes in response to receiving signals from the brake actuators 848 and/or brake sensors.

Controller(s) 836, which may include one or more system on chips (SoCs) 804 (FIG. 8C) and/or GPU(s), may provide signals (e.g., representative of commands) to one or more components and/or systems of the vehicle 800. For example, the controller(s) may send signals to operate the vehicle brakes via one or more brake actuators 848, to operate the steering system 854 via one or more steering actuators 856, to operate the propulsion system 850 via one or more throttle/accelerators 852. The controller(s) 836 may include one or more onboard (e.g., integrated) computing devices (e.g., supercomputers) that process sensor signals, and output operation commands (e.g., signals representing commands) to enable autonomous driving and/or to assist a human driver in driving the vehicle 800. The controller(s) 836 may include a first controller 836 for autonomous driving functions, a second controller 836 for functional safety functions, a third controller 836 for artificial intelligence functionality (e.g., computer vision), a fourth controller 836 for infotainment functionality, a fifth controller 836 for redundancy in emergency conditions, and/or other controllers. In some examples, a single controller 836 may handle two or more of the above functionalities, two or more controllers 836 may handle a single functionality, and/or any combination thereof.

The controller(s) 836 may provide the signals for controlling one or more components and/or systems of the vehicle 800 in response to sensor data received from one or more sensors (e.g., sensor inputs). The sensor data may be received from, for example and without limitation, global navigation satellite systems sensor(s) 858 (e.g., Global Positioning System sensor(s)), RADAR sensor(s) 860, ultrasonic sensor(s) 862, LiDAR sensor(s) 864, inertial measurement unit (IMU) sensor(s) 866 (e.g., accelerometer(s), gyroscope(s), magnetic compass(es), magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, speed sensor(s) 844 (e.g., for measuring the speed of the vehicle 800), vibration sensor(s) 842, steering sensor(s) 840, brake sensor(s) (e.g., as part of the brake sensor system 846), and/or other sensor types.

One or more of the controller(s) 836 may receive inputs (e.g., represented by input data) from an instrument cluster 832 of the vehicle 800 and provide outputs (e.g., represented by output data, display data, etc.) via a human-machine interface (HMI) display 834, an audible annunciator, a loudspeaker, and/or via other components of the vehicle 800. The outputs may include information such as vehicle velocity, speed, time, map data (e.g., the HD map 822 of FIG. 8C), location data (e.g., the vehicle's 800 location, such as on a map), direction, location of other vehicles (e.g., an occupancy grid), information about objects and status of objects as perceived by the controller(s) 836, etc. For example, the HMI display 834 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 800 further includes a network interface 824 which may use one or more wireless antenna(s) 826 and/or modem(s) to communicate over one or more networks. For example, the network interface 824 may be capable of communication over LTE, WCDMA, UMTS, GSM, CDMA2000, etc. The wireless antenna(s) 826 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

FIG. 8B is an example of camera locations and fields of view for the example autonomous vehicle 800 of FIG. 8A, in accordance with some embodiments of the present disclosure. The cameras and respective fields of view are one example embodiment and are not intended to be limiting. For example, additional and/or alternative cameras may be included and/or the cameras may be located at different locations on the vehicle 800.

The camera types for the cameras may include, but are not limited to, digital cameras that may be adapted for use with the components and/or systems of the vehicle 800. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 800 (e.g., front-facing cameras) may be used for surround view, to help identify forward facing paths and obstacles, as well aid in, with the help of one or more controllers 836 and/or control SoCs, providing information critical to generating an occupancy grid and/or determining the preferred vehicle paths. Front-facing cameras may be used to perform many of the same ADAS functions as LiDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 870 that may be used to perceive objects coming into view from the periphery (e.g., pedestrians, crossing traffic or bicycles). Although only one wide-view camera is illustrated in FIG. 8B, there may any number of wide-view cameras 870 on the vehicle 800. In addition, long-range camera(s) 898 (e.g., a long-view stereo camera pair) may be used for depth-based object detection, especially for objects for which a neural network has not yet been trained. The long-range camera(s) 898 may also be used for object detection and classification, as well as basic object tracking.

One or more stereo cameras 868 may also be included in a front-facing configuration. The stereo camera(s) 868 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 868 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 868 may be used in addition to, or alternatively from, those described herein.

Cameras with a field of view that include portions of the environment to the side of the vehicle 800 (e.g., side-view cameras) may be used for surround view, providing information used to create and update the occupancy grid, as well as to generate side impact collision warnings. For example, surround camera(s) 874 (e.g., four surround cameras 874 as illustrated in FIG. 8B) may be positioned to on the vehicle 800. The surround camera(s) 874 may include wide-view camera(s) 870, fisheye camera(s), 360 degree camera(s), and/or the like. Four example, four fisheye cameras may be positioned on the vehicle's front, rear, and sides. In an alternative arrangement, the vehicle may use three surround camera(s) 874 (e.g., left, right, and rear), and may leverage one or more other camera(s) (e.g., a forward-facing camera) as a fourth surround view camera.

Cameras with a field of view that include portions of the environment to the rear of the vehicle 800 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 898, stereo camera(s) 868), infrared camera(s) 872, etc.), as described herein.

FIG. 8C is a block diagram of an example system architecture for the example autonomous vehicle 800 of FIG. 8A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 800 in FIG. 8C are illustrated as being connected via bus 802. The bus 802 may include a Controller Area Network (CAN) data interface (alternatively referred to herein as a "CAN bus"). A CAN may be a network inside the vehicle 800 used to aid in control of various features and functionality of the vehicle 800, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 802 is described herein as being a CAN bus, this is not intended to be limiting. For example, in addition to, or alternatively from, the CAN bus, FlexRay and/or Ethernet may be used. Additionally, although a single line is used to represent the bus 802, this is not intended to be limiting. For example, there may be any number of busses 802, which may include one or more CAN busses, one or more FlexRay busses, one or more Ethernet busses, and/or one or more other types of busses using a different protocol. In some examples, two or more busses 802 may be used to perform different functions, and/or may be used for redundancy. For example, a first bus 802 may be used for collision avoidance functionality and a second bus 802 may be used for actuation control. In any example, each bus 802 may communicate with any of the components of the vehicle 800, and two or more busses 802 may communicate with the same components. In some examples, each SoC 804, each controller 836, and/or each computer within the vehicle may have access to the same input data (e.g., inputs from sensors of the vehicle 800), and may be connected to a common bus, such the CAN bus.

The vehicle 800 may include one or more controller(s) 836, such as those described herein with respect to FIG. 8A. The controller(s) 836 may be used for a variety of functions. The controller(s) 836 may be coupled to any of the various other components and systems of the vehicle 800, and may be used for control of the vehicle 800, artificial intelligence of the vehicle 800, infotainment for the vehicle 800, and/or the like.

The vehicle 800 may include a system(s) on a chip (SoC) 804. The SoC 804 may include CPU(s) 806, GPU(s) 808, processor(s) 810, cache(s) 812, accelerator(s) 814, data store(s) 816, and/or other components and features not illustrated. The SoC(s) 804 may be used to control the vehicle 800 in a variety of platforms and systems. For example, the SoC(s) 804 may be combined in a system (e.g., the system of the vehicle 800) with an HD map 822 which may obtain map refreshes and/or updates via a network interface 824 from one or more servers (e.g., server(s) 878 of FIG. 8D).

The CPU(s) 806 may include a CPU cluster or CPU complex (alternatively referred to herein as a "CCPLEX"). The CPU(s) 806 may include multiple cores and/or L2 caches. For example, in some embodiments, the CPU(s) 806 may include eight cores in a coherent multi-processor configuration. In some embodiments, the CPU(s) 806 may include four dual-core clusters where each cluster has a dedicated L2 cache (e.g., a 2 MB L2 cache). The CPU(s) 806 (e.g., the CCPLEX) may be configured to support simultaneous cluster operation enabling any combination of the clusters of the CPU(s) 806 to be active at any given time.

The CPU(s) 806 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 806 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 808 may include an integrated GPU (alternatively referred to herein as an "iGPU"). The GPU(s) 808 may be programmable and may be efficient for parallel workloads. The GPU(s) 808, in some examples, may use an enhanced tensor instruction set. The GPU(s) 808 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 808 may include at least eight streaming microprocessors. The GPU(s) 808 may use compute application programming interface(s) (API(s)). In addition, the GPU(s) 808 may use one or more parallel computing platforms and/or programming models (e.g., NVIDIA's CUDA).

The GPU(s) 808 may be power-optimized for best performance in automotive and embedded use cases. For example, the GPU(s) 808 may be fabricated on a Fin field-effect transistor (FinFET). However, this is not intended to be limiting and the GPU(s) 808 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 808 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 808 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 808 to access the CPU(s) 806 page tables directly. In such examples, when the GPU(s) 808 memory management unit (MMU) experiences a miss, an address translation request may be transmitted to the CPU(s) 806. In response, the CPU(s) 806 may look in its page tables for the virtual-to-physical mapping for the address and transmits the translation back to the GPU(s) 808. As such, unified memory technology may allow a single unified virtual address space for memory of both the CPU(s) 806 and the GPU(s) 808, thereby simplifying the GPU(s) 808 programming and porting of applications to the GPU(s) 808.

In addition, the GPU(s) 808 may include an access counter that may keep track of the frequency of access of the GPU(s) 808 to memory of other processors. The access counter may help ensure that memory pages are moved to the physical memory of the processor that is accessing the pages most frequently.

The SoC(s) 804 may include any number of cache(s) 812, including those described herein. For example, the cache(s) 812 may include an L3 cache that is available to both the CPU(s) 806 and the GPU(s) 808 (e.g., that is connected both the CPU(s) 806 and the GPU(s) 808). The cache(s) 812 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 804 may include an arithmetic logic unit(s) (ALU(s)) which may be leveraged in performing processing with respect to any of the variety of tasks or operations of the vehicle 800—such as processing DNNs. In addition, the SoC(s) 804 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 806 and/or GPU(s) 808.

The SoC(s) 804 may include one or more accelerators 814 (e.g., hardware accelerators, software accelerators, or a combination thereof). For example, the SoC(s) 804 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 808 and to off-load some of the tasks of the GPU(s) 808 (e.g., to free up more cycles of the GPU(s) 808 for performing other tasks). As an example, the accelerator(s) 814 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 814 (e.g., the hardware acceleration cluster) may include a deep learning accelerator(s) (DLA). The DLA(s) may include one or more tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 808, and by using an inference accelerator, for example, a designer may target either the DLA(s) or the GPU(s) 808 for any function. For example, the designer may focus processing of CNNs and floating point operations on the DLA(s) and leave other functions to the GPU(s) 808 and/or other accelerator(s) 814.

The accelerator(s) 814 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 806. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 814 (e.g., the hardware acceleration cluster) may include a computer vision network on-chip and SRAM, for providing a high-bandwidth, low latency SRAM for the accelerator(s) 814. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 804 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LiDAR data for purposes of localization and/or other functions, and/or for other uses. In some embodiments, one or more tree traversal units (TTUs) may be used for executing one or more ray-tracing related operations.

The accelerator(s) 814 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 866 output that correlates with the vehicle 800 orientation, distance, 3D location estimates of the object obtained from the neural network and/or other sensors (e.g., LiDAR sensor(s) 864 or RADAR sensor(s) 860), among others.

The SoC(s) 804 may include data store(s) 816 (e.g., memory). The data store(s) 816 may be on-chip memory of the SoC(s) 804, which may store neural networks to be executed on the GPU and/or the DLA. In some examples, the data store(s) 816 may be large enough in capacity to store multiple instances of neural networks for redundancy and safety. The data store(s) 812 may comprise L2 or L3 cache(s) 812. Reference to the data store(s) 816 may include reference to the memory associated with the PVA, DLA, and/or other accelerator(s) 814, as described herein.

The SoC(s) 804 may include one or more processor(s) 810 (e.g., embedded processors). The processor(s) 810 may include a boot and power management processor that may be a dedicated processor and subsystem to handle boot power and management functions and related security enforcement. The boot and power management processor may be a part of the SoC(s) 804 boot sequence and may provide runtime power management services. The boot power and management processor may provide clock and voltage programming, assistance in system low power state transitions, management of SoC(s) 804 thermals and temperature sensors, and/or management of the SoC(s) 804 power states. Each temperature sensor may be implemented as a ring-oscillator whose output frequency is proportional to temperature, and the SoC(s) 804 may use the ring-oscillators to detect temperatures of the CPU(s) 806, GPU(s) 808, and/or accelerator(s) 814. If temperatures are determined to exceed a threshold, the boot and power management processor may enter a temperature fault routine and put the SoC(s) 804 into a lower power state and/or put the vehicle 800 into a chauffeur to safe stop mode (e.g., bring the vehicle 800 to a safe stop).

The processor(s) 810 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 810 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 810 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 810 may further include a real-time camera engine that may include a dedicated processor subsystem for handling real-time camera management.

The processor(s) 810 may further include a high-dynamic range signal processor that may include an image signal processor that is a hardware engine that is part of the camera processing pipeline.

The processor(s) 810 may include a video image compositor that may be a processing block (e.g., implemented on a microprocessor) that implements video post-processing functions needed by a video playback application to produce the final image for the player window. The video image compositor may perform lens distortion correction on wide-view camera(s) 870, surround camera(s) 874, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 808 is not required to continuously render new surfaces. Even when the GPU(s) 808 is powered on and active doing 3D rendering, the video image compositor may be used to offload the GPU(s) 808 to improve performance and responsiveness.

The SoC(s) 804 may further include a mobile industry processor interface (MIPI) camera serial interface for receiving video and input from cameras, a high-speed interface, and/or a video input block that may be used for camera and related pixel input functions. The SoC(s) 804 may further include an input/output controller(s) that may be controlled by software and may be used for receiving I/O signals that are uncommitted to a specific role.

The SoC(s) 804 may further include a broad range of peripheral interfaces to enable communication with peripherals, audio codecs, power management, and/or other devices. The SoC(s) 804 may be used to process data from cameras (e.g., connected over Gigabit Multimedia Serial Link and Ethernet), sensors (e.g., LiDAR sensor(s) 864, RADAR sensor(s) 860, etc. that may be connected over Ethernet), data from bus 802 (e.g., speed of vehicle 800, steering wheel position, etc.), data from GNSS sensor(s) 858 (e.g., connected over Ethernet or CAN bus). The SoC(s) 804 may further include dedicated high-performance mass storage controllers that may include their own DMA engines, and that may be used to free the CPU(s) 806 from routine data management tasks.

The SoC(s) 804 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 804 may be faster, more reliable, and even more energy-efficient and space-efficient than conventional systems. For example, the accelerator(s) 814, when combined with the CPU(s) 806, the GPU(s) 808, and the data store(s) 816, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 820) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 808.

In some examples, a CNN for facial recognition and vehicle owner identification may use data from camera sensors to identify the presence of an authorized driver and/or owner of the vehicle 800. The always on sensor processing engine may be used to unlock the vehicle when the owner approaches the driver door and turn on the lights, and, in security mode, to disable the vehicle when the owner leaves the vehicle. In this way, the SoC(s) 804 provide for security against theft and/or carjacking.

In another example, a CNN for emergency vehicle detection and identification may use data from microphones 896 to detect and identify emergency vehicle sirens. In contrast to conventional systems, that use general classifiers to detect sirens and manually extract features, the SoC(s) 804 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 858. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 862, until the emergency vehicle(s) passes.

The vehicle may include a CPU(s) 818 (e.g., discrete CPU(s), or dCPU(s)), that may be coupled to the SoC(s) 804 via a high-speed interconnect (e.g., PCIe). The CPU(s) 818 may include an X86 processor, for example. The CPU(s) 818 may be used to perform any of a variety of functions, including arbitrating potentially inconsistent results between ADAS sensors and the SoC(s) 804, and/or monitoring the status and health of the controller(s) 836 and/or infotainment SoC 830, for example.

The vehicle 800 may include a GPU(s) 820 (e.g., discrete GPU(s), or dGPU(s)), that may be coupled to the SoC(s) 804 via a high-speed interconnect (e.g., NVIDIA's NVLINK). The GPU(s) 820 may provide additional artificial intelligence functionality, such as by executing redundant and/or different neural networks, and may be used to train and/or update neural networks based on input (e.g., sensor data) from sensors of the vehicle 800.

The vehicle 800 may further include the network interface 824 which may include one or more wireless antennas 826 (e.g., one or more wireless antennas for different communication protocols, such as a cellular antenna, a Bluetooth antenna, etc.). The network interface 824 may be used to enable wireless connectivity over the Internet with the cloud (e.g., with the server(s) 878 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 800 information about vehicles in proximity to the vehicle 800 (e.g., vehicles in front of, on the side of, and/or behind the vehicle 800). This functionality may be part of a cooperative adaptive cruise control functionality of the vehicle 800.

The network interface 824 may include a SoC that provides modulation and demodulation functionality and enables the controller(s) 836 to communicate over wireless networks. The network interface 824 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 800 may further include data store(s) 828 which may include off-chip (e.g., off the SoC(s) 804) storage. The data store(s) 828 may include one or more storage elements including RAM, SRAM, DRAM, VRAM, Flash, hard disks, and/or other components and/or devices that may store at least one bit of data.

The vehicle 800 may further include GNSS sensor(s) 858. The GNSS sensor(s) 858 (e.g., GPS, assisted GPS sensors, differential GPS (DGPS) sensors, etc.), to assist in mapping, perception, occupancy grid generation, and/or path planning functions. Any number of GNSS sensor(s) 858 may be used, including, for example and without limitation, a GPS using a USB connector with an Ethernet to Serial (RS-232) bridge.

The vehicle 800 may further include RADAR sensor(s) 860. The RADAR sensor(s) 860 may be used by the vehicle 800 for long-range vehicle detection, even in darkness and/or severe weather conditions. RADAR functional safety levels may be ASIL B. The RADAR sensor(s) 860 may use the CAN and/or the bus 802 (e.g., to transmit data generated by the RADAR sensor(s) 860) for control and to access object tracking data, with access to Ethernet to access raw data in some examples. A wide variety of RADAR sensor types may be used. For example, and without limitation, the RADAR sensor(s) 860 may be suitable for front, rear, and side RADAR use. In some example, Pulse Doppler RADAR sensor(s) are used.

The RADAR sensor(s) 860 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 860 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 800 surroundings at higher speeds with minimal interference from traffic in adjacent lanes. The other two antennae may expand the field of view, making it possible to quickly detect vehicles entering or leaving the vehicle's 800 lane.

Mid-range RADAR systems may include, as an example, a range of up to 860 m (front) or 80 m (rear), and a field of view of up to 42 degrees (front) or 850 degrees (rear).

Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 800 may further include ultrasonic sensor(s) 862. The ultrasonic sensor(s) 862, which may be positioned at the front, back, and/or the sides of the vehicle 800, may be used for park assist and/or to create and update an occupancy grid. A wide variety of ultrasonic sensor(s) 862 may be used, and different ultrasonic sensor(s) 862 may be used for different ranges of detection (e.g., 2.5 m, 4 m). The ultrasonic sensor(s) 862 may operate at functional safety levels of ASIL B.

The vehicle 800 may include LiDAR sensor(s) 864. The LiDAR sensor(s) 864 may be used for object and pedestrian detection, emergency braking, collision avoidance, and/or other functions. The LiDAR sensor(s) 864 may be functional safety level ASIL B. In some examples, the vehicle 800 may include multiple LiDAR sensors 864 (e.g., two, four, six, etc.) that may use Ethernet (e.g., to provide data to a Gigabit Ethernet switch).

In some examples, the LiDAR sensor(s) 864 may be capable of providing a list of objects and their distances for a 360-degree field of view. Commercially available LiDAR sensor(s) 864 may have an advertised range of approximately 800 m, with an accuracy of 2 cm-3 cm, and with support for a 800 Mbps Ethernet connection, for example. In some examples, one or more non-protruding LiDAR sensors 864 may be used. In such examples, the LiDAR sensor(s) 864 may be implemented as a small device that may be embedded into the front, rear, sides, and/or corners of the vehicle 800. The LiDAR sensor(s) 864, in such examples, may provide up to a 120-degree horizontal and 35-degree vertical field-of-view, with a 200 m range even for low-reflectivity objects. Front-mounted LiDAR sensor(s) 864 may be configured for a horizontal field of view between 45 degrees and 135 degrees.

In some examples, LiDAR technologies, such as 3D flash LiDAR, may also be used. 3D Flash LiDAR uses a flash of a laser as a transmission source, to illuminate vehicle surroundings up to approximately 200 m. A flash LiDAR unit includes a receptor, which records the laser pulse transit time and the reflected light on each pixel, which in turn corresponds to the range from the vehicle to the objects. Flash LiDAR may allow for highly accurate and distortion-free images of the surroundings to be generated with every laser flash. In some examples, four flash LiDAR sensors may be deployed, one at each side of the vehicle 800. Available 3D flash LiDAR systems include a solid-state 3D staring array LiDAR camera with no moving parts other than a fan (e.g., a non-scanning LiDAR device). The flash LiDAR device may use a 5 nanosecond class I (eye-safe) laser pulse per frame and may capture the reflected laser light in the form of 3D range point clouds and co-registered intensity data. By using flash LiDAR, and because flash LiDAR is a solid-state device with no moving parts, the LiDAR sensor(s) 864 may be less susceptible to motion blur, vibration, and/or shock.

The vehicle may further include IMU sensor(s) 866. The IMU sensor(s) 866 may be located at a center of the rear axle of the vehicle 800, in some examples. The IMU sensor(s) 866 may include, for example and without limitation, an accelerometer(s), a magnetometer(s), a gyroscope(s), a magnetic compass(es), and/or other sensor types. In some examples, such as in six-axis applications, the IMU sensor(s) 866 may include accelerometers and gyroscopes, while in nine-axis applications, the IMU sensor(s) 866 may include accelerometers, gyroscopes, and magnetometers.

In some embodiments, the IMU sensor(s) 866 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 866 may enable the vehicle 800 to estimate heading without requiring input from a magnetic sensor by directly observing and correlating the changes in velocity from GPS to the IMU sensor(s) 866. In some examples, the IMU sensor(s) 866 and the GNSS sensor(s) 858 may be combined in a single integrated unit.

The vehicle may include microphone(s) 896 placed in and/or around the vehicle 800. The microphone(s) 896 may be used for emergency vehicle detection and identification, among other things.

The vehicle may further include any number of camera types, including stereo camera(s) 868, wide-view camera(s) 870, infrared camera(s) 872, surround camera(s) 874, long-range and/or mid-range camera(s) 898, and/or other camera types. The cameras may be used to capture image data around an entire periphery of the vehicle 800. The types of cameras used depends on the embodiments and requirements for the vehicle 800, and any combination of camera types may be used to provide the necessary coverage around the vehicle 800. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 8A and FIG. 8B.

The vehicle 800 may further include vibration sensor(s) 842. The vibration sensor(s) 842 may measure vibrations of components of the vehicle, such as the axle(s). For example, changes in vibrations may indicate a change in road surfaces. In another example, when two or more vibration sensors 842 are used, the differences between the vibrations may be used to determine friction or slippage of the road surface (e.g., when the difference in vibration is between a power-driven axle and a freely rotating axle).

The vehicle 800 may include an ADAS system 838. The ADAS system 838 may include a SoC, in some examples. The ADAS system 838 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 860, LiDAR sensor(s) 864, and/or a camera(s). The ACC systems may include longitudinal ACC and/or lateral ACC. Longitudinal ACC monitors and controls the distance to the vehicle immediately ahead of the vehicle 800 and automatically adjust the vehicle speed to maintain a safe distance from vehicles ahead. Lateral ACC performs distance keeping, and advises the vehicle 800 to change lanes when necessary. Lateral ACC is related to other ADAS applications such as LCA and CWS.

CACC uses information from other vehicles that may be received via the network interface 824 and/or the wireless antenna(s) 826 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 800), while the I2V communication concept provides information about traffic further ahead. CACC systems may include either or both I2V and V2V information sources. Given the information of the vehicles ahead of the vehicle 800, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 860, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 860, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 800 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 800 if the vehicle 800 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 860, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 800 is backing up. Some RCTW systems include AEB to ensure that the vehicle brakes are applied to avoid a crash. RCTW systems may use one or more rear-facing RADAR sensor(s) 860, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 800, the vehicle 800 itself must, in the case of conflicting results, decide whether to heed the result from a primary computer or a secondary computer (e.g., a first controller 836 or a second controller 836). For example, in some embodiments, the ADAS system 838 may be a backup and/or secondary computer for providing perception information to a backup computer rationality module. The backup computer rationality monitor may run a redundant diverse software on hardware components to detect faults in perception and dynamic driving tasks. Outputs from the ADAS system 838 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 804.

In other examples, ADAS system 838 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 838 may be fed into the primary computer's perception block and/or the primary computer's dynamic driving task block. For example, if the ADAS system 838 indicates a forward crash warning due to an object immediately ahead, the perception block may use this information when identifying objects. In other examples, the secondary computer may have its own neural network which is trained and thus reduces the risk of false positives, as described herein.

The vehicle 800 may further include the infotainment SoC 830 (e.g., an in-vehicle infotainment system (IVI)). Although illustrated and described as a SoC, the infotainment system may not be a SoC, and may include two or more discrete components. The infotainment SoC 830 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 800. For example, the infotainment SoC 830 may radios, disk players, navigation systems, video players, USB and Bluetooth connectivity, carputers, in-car entertainment, Wi-Fi, steering wheel audio controls, hands free voice control, a heads-up display (HUD), an HMI display 834, a telematics device, a control panel (e.g., for controlling and/or interacting with various components, features, and/or systems), and/or other components. The infotainment SoC 830 may further be used to provide information (e.g., visual and/or audible) to a user(s) of the vehicle, such as information from the ADAS system 838, autonomous driving information such as planned vehicle maneuvers, trajectories, surrounding environment information (e.g., intersection information, vehicle information, road information, etc.), and/or other information.

The infotainment SoC 830 may include GPU functionality. The infotainment SoC 830 may communicate over the bus 802 (e.g., CAN bus, Ethernet, etc.) with other devices, systems, and/or components of the vehicle 800. In some examples, the infotainment SoC 830 may be coupled to a supervisory MCU such that the GPU of the infotainment system may perform some self-driving functions in the event that the primary controller(s) 836 (e.g., the primary and/or backup computers of the vehicle 800) fail. In such an example, the infotainment SoC 830 may put the vehicle 800 into a chauffeur to safe stop mode, as described herein.

The vehicle 800 may further include an instrument cluster 832 (e.g., a digital dash, an electronic instrument cluster, a digital instrument panel, etc.). The instrument cluster 832 may include a controller and/or supercomputer (e.g., a discrete controller or supercomputer). The instrument cluster 832 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 830 and the instrument cluster 832. In other words, the instrument cluster 832 may be included as part of the infotainment SoC 830, or vice versa.

Figure 8D:
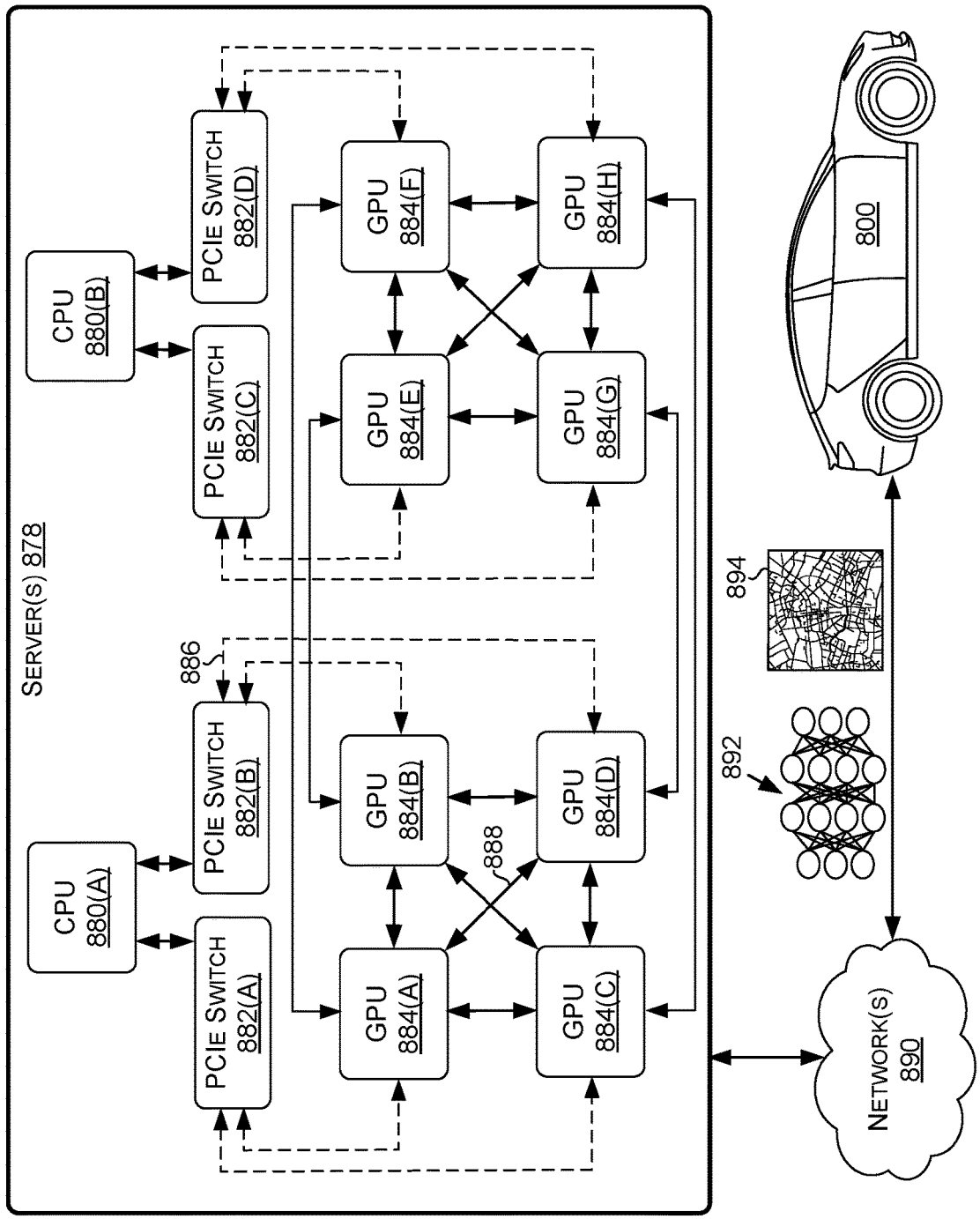
FIG. 8D is a system diagram for communication between cloud-based server(s) and the example autonomous vehicle of FIG. 8A, in accordance with some embodiments of the present disclosure.

FIG. 8D is a system diagram for communication between cloud-based server(s) and the example autonomous vehicle 800 of FIG. 8A, in accordance with some embodiments of the present disclosure. The system 876 may include server(s) 878, network(s) 890, and vehicles, including the vehicle 800. The server(s) 878 may include a plurality of GPUs 884(A)-884(H) (collectively referred to herein as GPUs 884), PCIe switches 882(A)-882(H) (collectively referred to herein as PCIe switches 882), and/or CPUs 880(A)-880(B) (collectively referred to herein as CPUs 880). The GPUs 884, the CPUs 880, and the PCIe switches may be interconnected with high-speed interconnects such as, for example and without limitation, NVLink interfaces 888 developed by NVIDIA and/or PCIe connections 886. In some examples, the GPUs 884 are connected via NVLink and/or NVSwitch SoC and the GPUs 884 and the PCIe switches 882 are connected via PCIe interconnects. Although eight GPUs 884, two CPUs 880, and two PCIe switches are illustrated, this is not intended to be limiting. Depending on the embodiment, each of the server(s) 878 may include any number of GPUs 884, CPUs 880, and/or PCIe switches. For example, the server(s) 878 may each include eight, sixteen, thirty-two, and/or more GPUs 884.

The server(s) 878 may receive, over the network(s) 890 and from the vehicles, image data representative of images showing unexpected or changed road conditions, such as recently commenced road-work. The server(s) 878 may transmit, over the network(s) 890 and to the vehicles, neural networks 892, updated neural networks 892, and/or map information 894, including information regarding traffic and road conditions. The updates to the map information 894 may include updates for the HD map 822, such as information regarding construction sites, potholes, detours, flooding, and/or other obstructions. In some examples, the neural networks 892, the updated neural networks 892, and/or the map information 894 may have resulted from new training and/or experiences represented in data received from any number of vehicles in the environment, and/or based on training performed at a datacenter (e.g., using the server(s) 878 and/or other servers).

The server(s) 878 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 890, and/or the machine learning models may be used by the server(s) 878 to remotely monitor the vehicles.

In some examples, the server(s) 878 may receive data from the vehicles and apply the data to up-to-date real-time neural networks for real-time intelligent inferencing. The server(s) 878 may include deep-learning supercomputers and/or dedicated AI computers powered by GPU(s) 884, such as a DGX and DGX Station machines developed by NVIDIA. However, in some examples, the server(s) 878 may include deep learning infrastructure that use only CPU-powered datacenters.

The deep-learning infrastructure of the server(s) 878 may be capable of fast, real-time inferencing, and may use that capability to evaluate and verify the health of the processors, software, and/or associated hardware in the vehicle 800. For example, the deep-learning infrastructure may receive periodic updates from the vehicle 800, such as a sequence of images and/or objects that the vehicle 800 has located in that sequence of images (e.g., via computer vision and/or other machine learning object classification techniques). The deep-learning infrastructure may run its own neural network to identify the objects and compare them with the objects identified by the vehicle 800 and, if the results do not match and the infrastructure concludes that the AI in the vehicle 800 is malfunctioning, the server(s) 878 may transmit a signal to the vehicle 800 instructing a fail-safe computer of the vehicle 800 to assume control, notify the passengers, and complete a safe parking maneuver.

For inferencing, the server(s) 878 may include the GPU(s) 884 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 9:
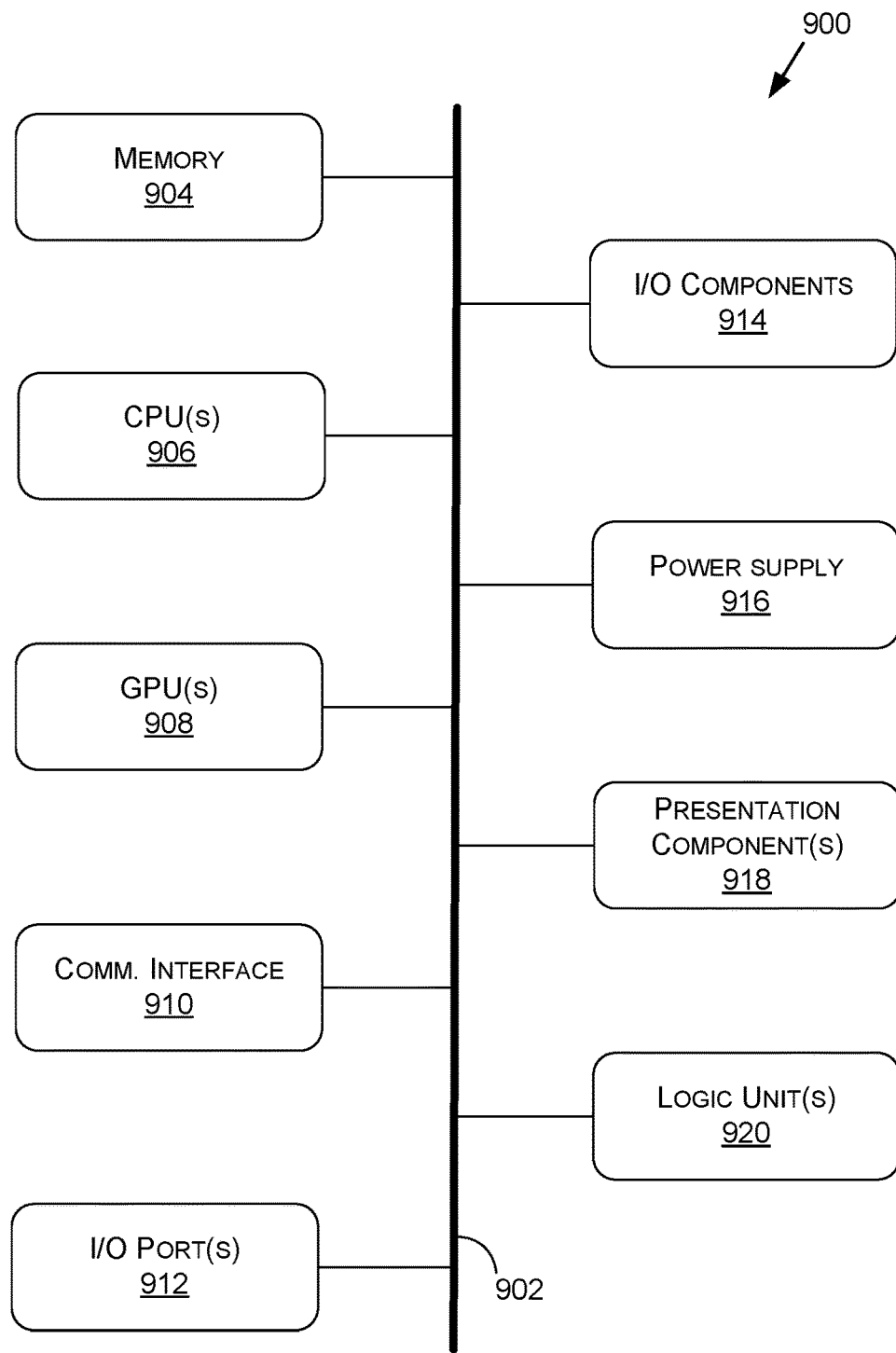
FIG. 9 is a block diagram of an example computing device suitable for use in implementing some embodiments of the present disclosure.

FIG. 9 is a block diagram of an example computing device(s) 900 suitable for use in implementing some embodiments of the present disclosure. Computing device 900 may include an interconnect system 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, one or more presentation components 918 (e.g., display(s)), and one or more logic units 920. In at least one embodiment, the computing device(s) 900 may comprise one or more virtual machines (VMs), and/or any of the components thereof may comprise virtual components (e.g., virtual hardware components). For non-limiting examples, one or more of the GPUs 908 may comprise one or more vGPUs, one or more of the CPUs 906 may comprise one or more vCPUs, and/or one or more of the logic units 920 may comprise one or more virtual logic units. As such, a computing device(s) 900 may include discrete components (e.g., a full GPU dedicated to the computing device 900), virtual components (e.g., a portion of a GPU dedicated to the computing device 900), or a combination thereof.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Tensor Cores (TCs), Tensor Processing Units (TPUs), Pixel Visual Cores (PVCs), Vision Processing Units (VPUs), Data Processing Units (DPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, etc.), and output the data (e.g., as an image, video, sound, etc.).

Example Data Center

Figure 10:
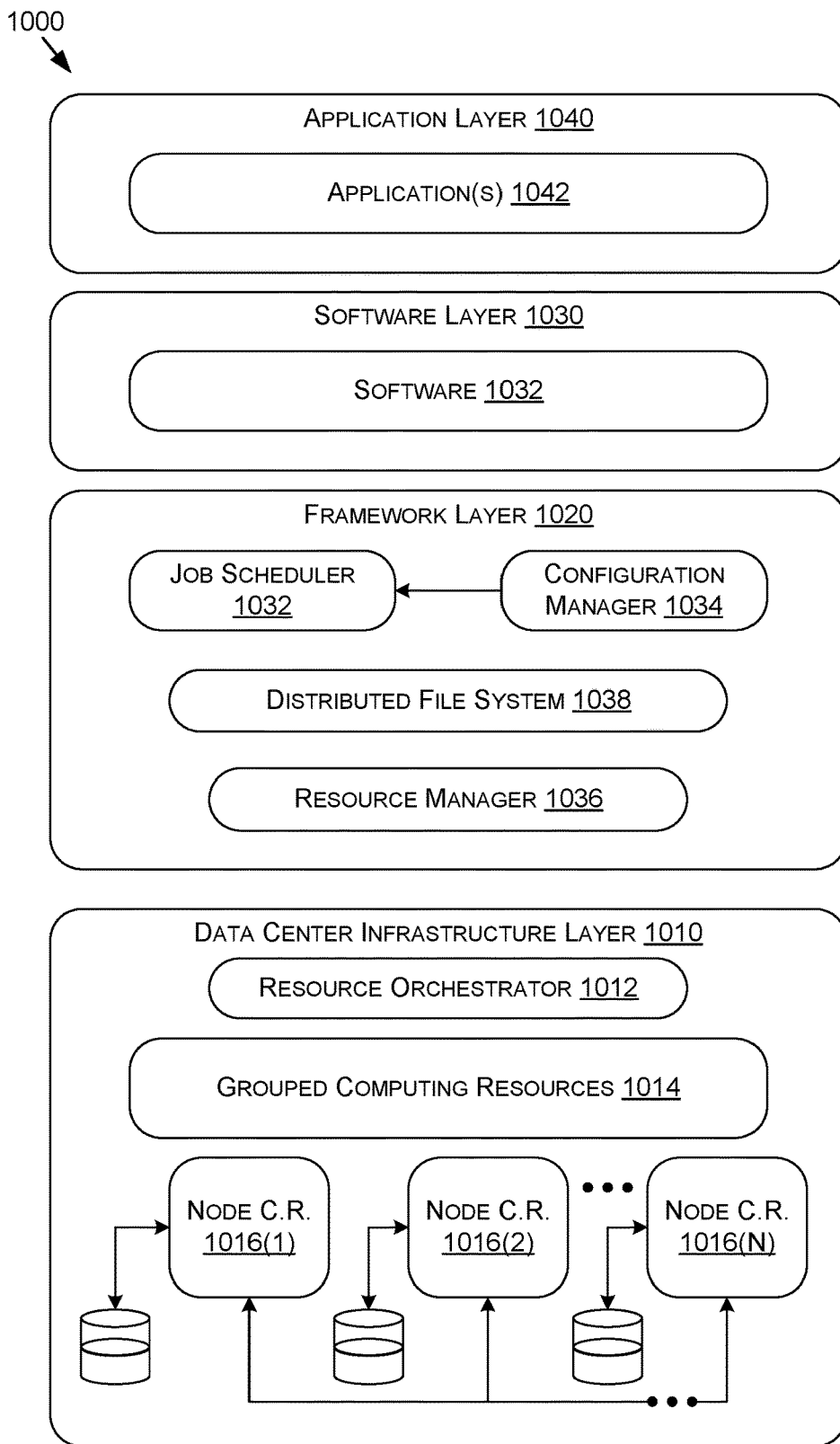
FIG. 10 is a block diagram of an example data center suitable for use in implementing some embodiments of the present disclosure.

FIG. 10 illustrates an example data center 1000 that may be used in at least one embodiments of the present disclosure. The data center 1000 may include a data center infrastructure layer 1010, a framework layer 1020, a software layer 1030, and/or an application layer 1040.

As shown in FIG. 10, the data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units ("CPUs") or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output ("NW I/O") devices, network switches, virtual machines ("VMs"), power modules, and/or cooling modules, etc. In some embodiments, one or more node C.R.s from among node C.R.s 1016(1)-1016(N) may correspond to a server having one or more of the above-mentioned computing resources. In addition, in some embodiments, the node C.R.s 1016(1)-10161 (N) may include one or more virtual components, such as vGPUs, vCPUs, and/or the like, and/or one or more of the node C.R.s 1016(1)-1016(N) may correspond to a virtual machine (VM).

In at least one embodiment, grouped computing resources 1014 may include separate groupings of node C.R.s 1016 housed within one or more racks (not shown), or many racks housed in data centers at various geographical locations (also not shown). Separate groupings of node C.R.s 1016 within grouped computing resources 1014 may include grouped compute, network, memory or storage resources that may be configured or allocated to support one or more workloads. In at least one embodiment, several node C.R.s 1016 including CPUs, GPUs, and/or other processors may be grouped within one or more racks to provide compute resources to support one or more workloads. The one or more racks may also include any number of power modules, cooling modules, and/or network switches, in any combination.

The resource orchestrator 1022 may configure or otherwise control one or more node C.R.s 1016(1)-1016(N) and/or grouped computing resources 1014. In at least one embodiment, resource orchestrator 1022 may include a software design infrastructure ("SDI") management entity for the data center 1000. The resource orchestrator 1022 may include hardware, software, or some combination thereof.

In at least one embodiment, as shown in FIG. 10, framework layer 1020 may include a job scheduler 1032, a configuration manager 1034, a resource manager 1036, and/or a distributed file system 1038. The framework layer 1020 may include a framework to support software 1032 of software layer 1030 and/or one or more application(s) 1042 of application layer 1040. The software 1032 or application(s) 1042 may respectively include web-based service software or applications, such as those provided by Amazon Web Services, Google Cloud and Microsoft Azure. The framework layer 1020 may be, but is not limited to, a type of free and open-source software web application framework such as Apache Spark™ (hereinafter "Spark") that may utilize distributed file system 1038 for large-scale data processing (e.g., "big data"). In at least one embodiment, job scheduler 1032 may include a Spark driver to facilitate scheduling of workloads supported by various layers of data center 1000. The configuration manager 1034 may be capable of configuring different layers such as software layer 1030 and framework layer 1020 including Spark and distributed file system 1038 for supporting large-scale data processing. The resource manager 1036 may be capable of managing clustered or grouped computing resources mapped to or allocated for support of distributed file system 1038 and job scheduler 1032. In at least one embodiment, clustered or grouped computing resources may include grouped computing resource 1014 at data center infrastructure layer 1010. The resource manager 1036 may coordinate with resource orchestrator 1012 to manage these mapped or allocated computing resources.

In at least one embodiment, software 1032 included in software layer 1030 may include software used by at least portions of node C.R.s 1016(1)-1016(N), grouped computing resources 1014, and/or distributed file system 1038 of framework layer 1020. One or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016(1)-1016 (N), grouped computing resources 1014, and/or distributed file system 1038 of framework layer 1020. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1034, resource manager 1036, and resource orchestrator 1012 may implement any number and type of self-modifying actions based on any amount and type of data acquired in any technically feasible fashion. Self-modifying actions may relieve a data center operator of data center 1000 from making possibly bad configuration decisions and possibly avoiding underutilized and/or poor performing portions of a data center.

The data center 1000 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1000. In at least one embodiment, trained or deployed machine learning models corresponding to one or more neural networks may be used to infer or predict information using resources described above with respect to the data center 1000 by using weight parameters calculated through one or more training techniques, such as but not limited to those described herein.

In at least one embodiment, the data center 1000 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 900 of FIG. 9—e.g., each device may include similar components, features, and/or functionality of the computing device(s) 900. In addition, where backend devices (e.g., servers, NAS, etc.) are implemented, the backend devices may be included as part of a data center 1000, an example of which is described in more detail herein with respect to FIG. 10.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 900 described herein with respect to FIG. 9. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
receiving first data representative of a first output, the first data obtained based at least on one or more first neural networks processing first sensor data obtained using one or more first sensors associated with a first field of view or a first sensory field;
receiving second data representative of a second output, the second data obtained based at least on one or more second neural networks processing second sensor data obtained using one or more second sensors associated with a second field of view or a second sensory field;
generating, based at least on one or more third neural networks processing the first data and the second data, third data representative of a fused output associated with the first output and the second output, the fused output associated with at least a portion of the first field of view or first sensory field and at least a portion of the second field of view or second sensory field; and
performing, based at least on the fused output, one or more operations associated with a machine.

2. The method of claim 1, wherein:
the one or more first sensors include a first type of sensor; and
the one or more second sensors include a second type of sensor different from the first type of sensor.

3. The method of claim 1, wherein
one or more second sensors include a same type of sensor as the one or more first sensors.

4. The method of claim 1, wherein:
the first data representative of the first output is associated with the first field of view or first sensory field;
the second data representative of the second output is associated with the second field of view or second sensor field; and
the third data representative of the fused output is associated with a third field of view, the third field of view including at least the portion of the first field of view and at least the portion of the second field of view.

5. The method of claim 1, wherein:
the first data representative of the first output is associated with a first representation of an object;
the second data representative of the second output is associated with a second representation of the object; and
the third data representative of the fused output is also associated with a fused representation of the object.

6. The method of claim 1, further comprising:
receiving fourth data representative of at least one of one or more probability distribution representations, one or more velocity representations, one or more object instance representations, or one or more object appearance representations,
wherein the generating the third data representative of the fused output is further based at least on the fourth data.

7. The method of claim 1, wherein:
the first output includes at least one of one or more first locations associated with one or more first objects, one or more first velocities associated with the one or more first objects, one or more first orientations associated with the one or more first objects, or one or more first classifications associated with the one or more first objects;

the second output includes at least one of one or more second locations associated with one or more second objects, one or more second velocities associated with the one or more second objects, one or more second orientations associated with the one or more second objects, or one or more second classifications associated with the one or more second objects; and
the fused output includes at least one of one or more fused locations associated with one or more fused objects, one or more fused velocities associated with the one or more fused objects, one or more fused orientations associated with the one or more fused objects, or one or more fused classifications associated with the one or more fused objects.

8. A system comprising:
one or more processing units to:
generate, using one or more first neural networks and based at least on first sensor data obtained using a first set of one or more sensors associated with a first field of view or a first sensory field, first data representative of a first output;
generate, using one or more second neural networks and based at least on second sensor data obtained a second set of one or more sensors associated with a second field of view or second sensory field, second data representative of a second output;
generate, based at least on one or more third neural networks processing the first data and the second data, third data representative of a third output associated with the first output and the second output; and
perform, based at least on the third data, one or more operations associated with a machine.

9. The system of claim 8, wherein:
the first set of one or more sensors is associated with a first type of sensor; and
the second set of one or more sensors is associated with a second type of sensor different from the first type of sensor.

10. The system of claim 8, wherein:
the second set of one or more sensors is associated with a same type of sensor as the first set of one or more sensors.

11. The system of claim 8, wherein:
the first data representative of the first output is associated with the first field of view or the first sensory field;
the second data representative of the second output is associated with the second field of view or the second sensory field; and
the third data representative of the third output is associated with a third field of view or third sensory field, the third field of view or the third sensory field including at least a portion of the first field of view or first sensory field and at least a portion of the second field of view or the second sensory field.

12. The system of claim 8, wherein:
the first data representative of the first output is associated with a first representation of an object;
the second data representative of the second output is associated with a second representation of the object; and
the third data representative of the third output is also associated with a fused representation of the object.

13. The system of claim 8, wherein the one or more processing units are further to:
receive fourth data representative of at least one of one or more probability distribution representations, one or more velocity representations, one or more object instance representations, or one or more object appearance representations, wherein the generation of the third data representative of the third output is further based at least on the fourth data.

14. The system of claim 8, wherein the system is comprised in at least one of:
- a control system for an autonomous or semi-autonomous machine;
- a perception system for an autonomous or semi-autonomous machine;
- a system for performing simulation operations;
- a system for performing deep learning operations;
- a system implemented using an edge device;
- a system implemented using a robot;
- a system incorporating one or more virtual machines (VMs);
- a system implemented at least partially in a data center; or
- a system implemented at least partially using cloud computing resources.

15. A processor comprising:
processing circuitry to:
- receive first data representative of one or more first outputs generated based at least on one or more first neural networks processing first sensor data, the first sensor data obtained using a first set of one or more sensors;
- receive second data representative of one or more second view outputs generated based at least on one or more second neural networks processing second sensor data, the second sensor data obtained using a second set of one or more sensors;
- generate, based at least on one or more third neural networks processing the first data and the second data, third data representative of a fused output associated with the one or more first outputs and the one or more second outputs; and
- cause performance of one or more operations of a machine based at least on the fused output.

16. The processor of claim 15, wherein the processor is comprised in at least one of:
- a control system for an autonomous or semi-autonomous machine;
- a perception system for an autonomous or semi-autonomous machine;
- a system for performing simulation operations;
- a system for performing deep learning operations;
- a system implemented using an edge device;
- a system implemented using a robot;
- a system incorporating one or more virtual machines (VMs);
- a system implemented at least partially in a data center; or
- a system implemented at least partially using cloud computing resources.

17. The method of claim 1, wherein at least one of:
- the one or more first sensors include a first plurality of sensors; or
- the one or more second sensors include a second plurality of sensors.

18. The method of claim 1, wherein:
- the first output includes a first representation;
- the second output includes a second representation, the second representation including a same type of representation as the first representation; and
- the fused output includes a third representation that includes at least a portion of the first representation and at least a portion of the second representation.

19. The method of claim 1, wherein at least one of:
- the one or more first neural networks include a first plurality of neural networks; or
- the one or more second neural networks include a second plurality of neural networks.

20. The method of claim 1, wherein:
- the one or more second neural networks include a plurality of neural networks; and
- the one or more second outputs include a plurality of outputs, an individual output of the plurality of outputs being generated using an individual neural network of the plurality of neural networks.

* * * * *